United States Patent
Short, Jr. et al.

(10) Patent No.: US 12,360,234 B1
(45) Date of Patent: Jul. 15, 2025

(54) RF-BASED MATERIAL IDENTIFICATION SYSTEMS AND METHODS

(71) Applicant: QUANTUM IP, LLC, Stuart, FL (US)

(72) Inventors: Robert J. Short, Jr., Stuart, FL (US); Lee Duke, Stuart, FL (US)

(73) Assignee: QUANTUMP IP, LLC, Stuart, FL (US)

( * ) Notice: Subject to any disclaimer, the term of this patent is extended or adjusted under 35 U.S.C. 154(b) by 0 days.

(21) Appl. No.: 18/782,964

(22) Filed: Jul. 24, 2024

Related U.S. Application Data

(60) Provisional application No. 63/667,592, filed on Jul. 3, 2024.

(51) Int. Cl.
　　*G01S 13/88*　　(2006.01)
　　*G01S 13/42*　　(2006.01)
　　*G01S 13/46*　　(2006.01)

(52) U.S. Cl.
　　CPC ............ *G01S 13/887* (2013.01); *G01S 13/42* (2013.01); *G01S 13/46* (2013.01); *G01S 2013/468* (2013.01)

(58) Field of Classification Search
　　CPC ........ G01S 13/887; G01S 13/42; G01S 13/46; G01S 2013/468; G01S 7/03; G01S 13/885; H01Q 3/36
　　See application file for complete search history.

(56) References Cited

U.S. PATENT DOCUMENTS

| | | | |
|---|---|---|---|
| 2,116,717 A | * | 5/1938 | Scharlau ................. G01S 13/46 33/300 |
| 3,725,917 A | | 4/1973 | Sletten et al. |
| 3,983,558 A | | 9/1976 | Rittenbach |

(Continued)

FOREIGN PATENT DOCUMENTS

| | | |
|---|---|---|
| CN | 107102325 | 8/2017 |
| CN | 117091456 | 11/2023 |

(Continued)

OTHER PUBLICATIONS

U.S. Appl. No. 18/921,840, filed Oct. 21, 2024, Robert J. Short Jr., RF-Based Material Detection Device that Uses Specific Antennas Designed for Specific Substances.

(Continued)

*Primary Examiner* — Vladimir Magloire
*Assistant Examiner* — Yonghong Li
(74) *Attorney, Agent, or Firm* — Polsinelli LLP; Kory D. Christensen

(57) ABSTRACT

A system for material detection and identification includes an interface configured to access a material database associating each of a plurality of materials with one or more corresponding resonance frequencies; an RF transmitter configured to, for each material of at least a subset of the plurality of materials in the material database, transmit into an environment an RF signal at a first resonance frequency for the material; an RF receiver configured to receive a response signal from the environment for each RF signal; and a processor configured to analyze each response signal for resonance characteristics that indicate a presence of the material and identifying the material to a user if the presence of the material is indicated by the resonance characteristics.

29 Claims, 5 Drawing Sheets

(56) References Cited

U.S. PATENT DOCUMENTS

| | | | |
|---|---|---|---|
| 4,132,943 A | 1/1979 | Gournay et al. | |
| 4,217,585 A | 8/1980 | Fishbein et al. | |
| 4,296,378 A | 10/1981 | King | |
| 4,514,691 A | 4/1985 | De Los Santos et al. | |
| 4,897,660 A | 1/1990 | Gold et al. | |
| 5,227,800 A | 7/1993 | Huguenin et al. | |
| 5,233,300 A | 8/1993 | Buess et al. | |
| 5,592,083 A | 1/1997 | Magnuson et al. | |
| 5,745,071 A | 4/1998 | Blackmon et al. | |
| 6,297,765 B1 | 10/2001 | Frazier et al. | |
| 6,359,582 B1* | 3/2002 | MacAleese | G01V 3/12 342/197 |
| 6,967,612 B1* | 11/2005 | Gorman | G01S 13/04 342/52 |
| 7,251,310 B2 | 7/2007 | Smith | |
| 7,288,927 B2 | 10/2007 | Nutting et al. | |
| 7,405,692 B2 | 7/2008 | McMakin et al. | |
| 7,825,648 B2 | 11/2010 | Nutting et al. | |
| 8,138,770 B2 | 3/2012 | Pechmann et al. | |
| 8,188,862 B1 | 5/2012 | Tam et al. | |
| 8,242,447 B1 | 8/2012 | Chawla | |
| 8,242,450 B2 | 8/2012 | Gaziano | |
| 8,502,666 B1 | 8/2013 | Tam et al. | |
| 8,890,745 B2 | 11/2014 | Wahlquist et al. | |
| 9,182,481 B2 | 11/2015 | Bowring et al. | |
| 9,500,609 B1 | 11/2016 | Zank | |
| 9,915,727 B1 | 3/2018 | Reznack et al. | |
| 10,204,775 B2* | 2/2019 | Brown | H01J 49/0095 |
| 10,229,328 B2 | 3/2019 | Nikolova et al. | |
| 10,268,889 B2 | 4/2019 | Brown et al. | |
| 10,816,658 B2 | 10/2020 | Frizzell | |
| 10,890,656 B2 | 1/2021 | Heinen | |
| 11,280,898 B2 | 3/2022 | Morton | |
| 11,422,252 B2* | 8/2022 | Bowring | G01S 7/417 |
| 11,493,494 B2 | 11/2022 | Wilson et al. | |
| 12,248,062 B1 | 3/2025 | Short et al. | |
| 2002/0008655 A1 | 1/2002 | Haj-Yousef | |
| 2003/0196543 A1 | 10/2003 | Moser et al. | |
| 2004/0039713 A1 | 2/2004 | Beck | |
| 2004/0125020 A1 | 7/2004 | Hendler et al. | |
| 2004/0232054 A1 | 11/2004 | Brown et al. | |
| 2004/0252062 A1 | 12/2004 | Tracy et al. | |
| 2005/0081634 A1 | 4/2005 | Matsuzawa | |
| 2005/0200528 A1 | 9/2005 | Carrender et al. | |
| 2005/0230604 A1* | 10/2005 | Rowe | G01S 13/89 250/221 |
| 2006/0008051 A1 | 1/2006 | Heaton et al. | |
| 2007/0074580 A1 | 4/2007 | Fallah-Rad et al. | |
| 2007/0115183 A1 | 5/2007 | Kim et al. | |
| 2007/0188377 A1 | 8/2007 | Krikorian et al. | |
| 2008/0283761 A1* | 11/2008 | Robinson | G01N 23/04 250/370.09 |
| 2009/0085565 A1 | 4/2009 | Fullerton | |
| 2009/0195435 A1 | 8/2009 | Kapilevich et al. | |
| 2009/0262005 A1 | 10/2009 | McNeill et al. | |
| 2010/0046704 A1 | 2/2010 | Song et al. | |
| 2010/0079280 A1 | 4/2010 | Lacaze et al. | |
| 2010/0128852 A1 | 5/2010 | Yamamoto et al. | |
| 2010/0134102 A1 | 6/2010 | Crowley | |
| 2010/0164831 A1 | 7/2010 | Rentz et al. | |
| 2010/0182594 A1 | 7/2010 | Carron | |
| 2011/0050241 A1 | 3/2011 | Nutting et al. | |
| 2011/0233419 A1 | 9/2011 | Norris | |
| 2012/0248313 A1* | 10/2012 | Karam | G01N 21/3581 250/336.1 |
| 2015/0160181 A1 | 6/2015 | White et al. | |
| 2016/0011307 A1 | 1/2016 | Casse et al. | |
| 2016/0047757 A1 | 2/2016 | Kuznetsov et al. | |
| 2016/0124071 A1 | 5/2016 | Baxley et al. | |
| 2016/0166843 A1 | 6/2016 | Casse et al. | |
| 2016/0195608 A1 | 7/2016 | Ruenz | |
| 2016/0223666 A1 | 8/2016 | Kim et al. | |
| 2016/0274230 A1 | 9/2016 | Wu et al. | |
| 2016/0327634 A1 | 11/2016 | Katz et al. | |
| 2017/0011255 A1 | 1/2017 | Kaditz et al. | |
| 2017/0350834 A1 | 12/2017 | Prado et al. | |
| 2018/0067204 A1 | 3/2018 | Frizzell | |
| 2019/0137653 A1 | 5/2019 | Starr et al. | |
| 2019/0154439 A1* | 5/2019 | Binder | G01S 15/08 |
| 2019/0208112 A1 | 7/2019 | Kleinbeck | |
| 2019/0219687 A1 | 7/2019 | Baheti et al. | |
| 2020/0166634 A1 | 5/2020 | Peleg | |
| 2020/0173970 A1 | 6/2020 | Wilson et al. | |
| 2020/0264298 A1 | 8/2020 | Haseltine et al. | |
| 2020/0333412 A1 | 10/2020 | Nichols et al. | |
| 2020/0371227 A1* | 11/2020 | Malhi | G01S 13/887 |
| 2021/0041376 A1* | 2/2021 | Ashiwal | G01N 22/00 |
| 2021/0096240 A1 | 4/2021 | Padmanabhan et al. | |
| 2021/0312201 A1 | 10/2021 | Hastings et al. | |
| 2021/0373098 A1 | 12/2021 | Fraundorfer et al. | |
| 2022/0171017 A1 | 6/2022 | McFadden et al. | |
| 2022/0265882 A1 | 8/2022 | Lemchen | |
| 2022/0311135 A1 | 9/2022 | Guo et al. | |
| 2022/0365168 A1 | 11/2022 | Amizur et al. | |
| 2022/0408643 A1 | 12/2022 | Somarowthu et al. | |
| 2023/0243761 A1 | 8/2023 | Somarowthu et al. | |
| 2023/0375695 A1 | 11/2023 | Tan | |
| 2024/0036166 A1 | 2/2024 | Geng et al. | |
| 2024/0372600 A1 | 11/2024 | Schreck et al. | |

FOREIGN PATENT DOCUMENTS

| | | |
|---|---|---|
| JP | 2014095625 | 5/2014 |
| WO | WO 2024091157 | 5/2024 |
| WO | PCT/US2024/039348 | 7/2024 |

OTHER PUBLICATIONS

U.S. Appl. No. 18/922,682, filed Oct. 22, 2024, Robert J. Short Jr., Enhanced Antenna Materials for Low-Frequency Detection of Materials.

U.S. Appl. No. 18/922,693, filed Oct. 22, 2024, Robert J. Short Jr., Dynamic Phased Array Resonator Systems and Methods for Determining a Material Substance.

U.S. Appl. No. 18/923,518, filed Oct. 22, 2024, Robert J. Short Jr., Currency RF-Based Verification Device.

U.S. Appl. No. 18/922,702, filed Oct. 22, 2024, Robert J. Short Jr., Enhanced Material Detection and Frequency Sweep Analysis of Controlled Substances via Digital Signal Processing.

U.S. Appl. No. 18/922,729, filed Oct. 22, 2024, Robert J. Short Jr., RF-Based Detection Device for Material Identification Using a Smart Frequency Selection Method.

U.S. Appl. No. 18/929,189, filed Oct. 28, 2024, Robert J. Short Jr., RF-Specific Material Detection Device for an Application-Specific Device.

U.S. Appl. No. 18/934,569, filed Nov. 1, 2024, Robert J. Short Jr., Networked RF Material Devices for Substance Detection via Opposed Perimeter Sensors.

U.S. Appl. No. 18/939,132, filed Nov. 6, 2024, Robert J. Short Jr., RF Material Detection Device With Smart Scanning Multiple Axis Gimbal Integrated With Haptics.

U.S. Appl. No. 18/938,584, filed Nov. 6, 2024, Robert J. Short Jr., RF Transmit and Receiver Antenna Detector System.

U.S. Appl. No. 18/936,177, filed Nov. 4, 2024, Robert J. Short Jr., Method and System for Detecting and Quantifying Specific Substances, Elements, or Conditions Utilizing an AI Module.

U.S. Appl. No. 18/942,906, filed Nov. 11, 2024, Robert J. Short Jr., RF-Specific Material Detection Device Integrated Into Application-Specific Drone Device.

U.S. Appl. No. 18/936,500, filed Nov. 4, 2024, Robert J. Short Jr., RF-Based Special Material Detection System With Secure Multi-Dimensional Authentication.

U.S. Appl. No. 18/938,691, filed Nov. 6, 2024, Robert J. Short Jr., RF-Based AI Determination of Materials by Cycling Through Detection Patterns for Specific Applications.

U.S. Appl. No. 18/946,014, filed Nov. 13, 2024, Robert J. Short Jr., RF-Based Special Material Detection Securing Entry Points and Access.

(56) References Cited

OTHER PUBLICATIONS

PCT Application No. PCT/US2024/039348, International Search Report and Written Opinion dated Oct. 17, 2024.
U.S. Appl. No. 18/922,693, Non-Final Office Action dated Nov. 26, 2024.
U.S. Appl. No. 18/922,729, Non-Final Office Action dated Dec. 16, 2024.
U.S. Appl. No. 18/929,189, Non-Final Office Action dated Jan. 24, 2025.
U.S. Appl. No. 18/939,132, Non-Final Office Action dated Dec. 26, 2024.
U.S. Appl. No. 18/936,177, Non-Final Office Action dated Jan. 21, 2025.
U.S. Appl. No. 18/936,500, Non-Final Office Action dated Dec. 23, 2024.
U.S. Appl. No. 18/946,014, Non-Final Office Action dated Jan. 16, 2025.
Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019.8879110.
Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007.366257, 2007.
Itozaki et al., "Nuclear Quadrupole Resonance for Explosive Detection," International Journal on Smart Sensing and Intelligent Systems, vol. 1, No. 3, Sep. 2008.
U.S. Appl. No. 18/921,840, Non-Final Office Action dated Feb. 28, 2025.
U.S. Appl. No. 18/922,693, Final Office Action dated Mar. 17, 2025.
U.S. Appl. No. 18/938,584, Non-Final Office Action dated Feb. 24, 2025.
U.S. Appl. No. 18/922,693, Non-Final Office Action dated Jun. 4, 2025.

\* cited by examiner

| Frequency | Resonant Materials | Application A Priority Tier | Application B Priority Tier | ... | Application N Priority Tier |
|---|---|---|---|---|---|
| 33Hz | Arsenic (As) | 1 | 2 | ... | 1 |
| 42Hz | As | 1 | 2 | ... | 1 |
| 75Hz | As | 1 | 2 | ... | 1 |
| 92Hz | Uranium (U) | 2 | 1 | ... | 2 |
| 160Hz | O2, CH4 | 3 | 3 | ... | 1 |
| 180Hz | HCl, H2O2 | 1 | 1 | ... | 1 |
| 235Hz | U(235) | 2 | 1 | ... | 2 |
| 238Hz | U(238) | 2 | 1 | ... | 2 |
| 340Hz | H2O2 | 1 | 1 | ... | 3 |
| 360Hz | HCl | 3 | 1 | ... | 3 |
| 1160Hz | CH2NO3CHNO3CH2NO3 | 3 | 1 | ... | 4 |
| 28,430Hz | Prostate-Specific Antigen | 1 | . | ... | 2 |
| 200GHz | Cancer Antigen 125 | 1 | . | ... | 2 |
| 69GHz | Alpha-fetoprotein | 1 | . | ... | 2 |
| 36.7GHz | Human Chorionic Gonadotropin | 1 | . | ... | 2 |
| 180GHz | Carcinoembryonic Antigen | 1 | . | ... | 2 |
| . | . | . | . | ... | . |
| . | . | . | . | ... | . |

| Material | Distance | Mass | Amplitude |
|---|---|---|---|
| HCl | 10m | 1g | 4.5dB |
| H2O2 | 10m | 1g | 1.5dB |
| CH2NO3CHNO3CH2NO3 | 10m | 1g | 0.6dB |
| Uranium | 10m | 1g | 10dB |
| Uranium | 100m | 1g | -10dB |
| Uranium | 10m | 2g | 15dB |
| Prostate-Specific Antigen | 10cm | 100ng | -20dB |
| Cancer Antigen 125 | 10cm | 100ng | -160dB |
| Alpha-fetoprotein | 10cm | 100ng | -161dB |
| Human Chorionic Gonadotropin | 10cm | 100ng | -164dB |
| Carcinoembryonic Antigen | 10cm | 100ng | -162dB |

FIG. 9

RF-BASED MATERIAL IDENTIFICATION SYSTEMS AND METHODS

CROSS-REFERENCE TO RELATED APPLICATIONS

This application claims the benefit of U.S. Provisional Application No. 63/667,592, filed Jul. 3, 2024, for RF BASED DETECTION DEVICE FOR MATERIAL IDENTIFICATION, MASS, AND LOCATION DISPLAYED ON A USER INTERFACE, which is incorporated herein by reference.

TECHNICAL FIELD

The present disclosure relates to RF-based material identification.

BACKGROUND

Current non-invasive medical imaging techniques struggle to accurately detect and localize small, metastasized cancerous cells within the body, often requiring high power levels and advanced imaging machinery. Similarly, traditional methods for detecting hazardous materials, such as explosives or narcotics, in large and crowded areas often lack the spatial resolution and specificity needed to identify these materials accurately without false positives. Likewise, existing environmental monitoring systems frequently fail to detect and locate low-concentration pollutants or contaminants in ecosystems, leading to incomplete or delayed responses to environmental hazards. Systems and methods to detect and identify specific materials at a distance without the limitations of conventional approaches would be of considerable value in many fields including medicine, security, and environmental protection.

SUMMARY

According to one aspect, a method for material detection and identification includes accessing a material database associating each of a plurality of materials with one or more corresponding resonance frequencies. The method also includes, for each material of at least a subset of the plurality of materials in the material database: transmitting into an environment an RF signal at a first resonance frequency for the material; receiving a response signal from the environment; analyzing the response signal for resonance characteristics that indicate a presence of the material; and identifying the material to a user if the presence of the material is indicated by the resonance characteristics.

In some configurations, the material database indicates a priority of detecting each material of the at least the subset of materials for one or more applications, and transmitting includes transmitting into the environment the RF signal at the first resonance frequency for each material in order of the priority for a specific application. The at least the subset of the plurality of materials may be selected by the user.

In certain implementations, if no materials are identified or ambiguous resonance characteristics are detected, the method includes repeating the steps of transmitting, receiving, analyzing, and identifying using a second resonance frequency for one or more of the materials in the material database.

In other implementations, if no materials are identified or ambiguous resonance characteristics are detected, the method includes incorporating at least one of environmental or contextual data to refine a likelihood of specific materials being present.

In still other implementations, if no materials are identified or ambiguous resonance characteristics are detected, the method includes analyzing at least one of a timing of receipt or amplitude of the response signal.

In additional implementations, if no materials are identified or ambiguous resonance characteristics are detected, the method includes repeating the steps of transmitting, receiving, analyzing, and identifying using one or more different materials databases.

In further implementations, if no materials are identified or ambiguous resonance characteristics are detected, the method includes integrating input from at least one other sensing modality, such as a mass spectrometer, an x-ray diffraction analyzer, an x-ray fluorescence analyzer, a magnetic resonance imaging (MRI) scanner, a computed tomography (CT) scanner, and an optical imager.

In some examples, analyzing comprises comparing signal strengths at a plurality of frequencies for a particular material. In additional examples, the method includes using machine learning to recognize patterns between the material and the resonance characteristics that indicate the presence of the material.

In some configurations, transmitting the RF signal is performed by an RF transmitter and receiving the response signal from the environment includes receiving the response signal using a multi-point receiving antenna. In such configurations, the method further includes calculating a direction of the material relative to the RF transmitter based on triangulating the response signal received by the multi-point receiving antenna; and displaying an indication of the direction of the material.

In certain configurations, transmitting the RF signal is performed by an RF transmitter, and the method further includes calculating a distance between the RF transmitter and the material using time-of-flight data of the RF signal and the response signal. Calculating the distance between the RF transmitter and the material using the time-of-flight data may include adjusting the time-of-flight data based on media through which the RF signal and the response signal must travel.

In some implementations, the method further includes calculating a mass of the material based on an amplitude of the response signal and the distance between the RF transmitter and the material. Calculating the mass of the material may include accessing a mass database associating distance, mass, and response signal amplitude for at least one of the plurality of materials in the material database.

According to another aspect, a system for material detection and identification includes an interface configured to access a material database associating each of a plurality of materials with one or more corresponding resonance frequencies. The system also includes: an RF transmitter configured to, for each material of at least a subset of the plurality of materials in the material database, transmit into an environment an RF signal at a first resonance frequency for the material; an RF receiver configured to receive a response signal from the environment for each RF signal; and a processor configured to analyze each response signal for resonance characteristics that indicate a presence of the material and identifying the material to a user if the presence of the material is indicated by the resonance characteristics.

In some configurations, the material database indicates a priority of detecting each material of the at least the subset of materials for one or more applications, and the RF transmitter is configured to transmit into the environment the RF signal at the first resonance frequency for each material in order of the priority for a specific application.

In certain configurations, the processor is further configured to generate a user interface for the user to select the at least the subset of the plurality of materials.

In some implementations, if no materials are identified or ambiguous resonance characteristics are detected, the RF transmitter is further configured to, for at least one materials of the at least the subset of the plurality of materials in the material database, transmit into the environment at least one RF signal at a second resonance frequency for the at least one material.

In additional implementations, if no materials are identified or ambiguous resonance characteristics are detected, the processor is further configured to incorporate at least one of environmental or contextual data to refine a likelihood of specific materials being present.

In further implementations, if no materials are identified or ambiguous resonance characteristics are detected, the processor is further configured to analyze at least one of a timing of receipt or amplitude of the response signal.

In some implementations, if no materials are identified or ambiguous resonance characteristics are detected, the processor is further configured to repeat a detection process using one or more different materials databases.

In certain implementations, if no materials are identified or ambiguous resonance characteristics are detected, the processor is configured to integrate input from at least one other sensing modality. The at least one other sensing modality may include a mass spectrometer, an x-ray diffraction analyzer, an x-ray fluorescence analyzer, a magnetic resonance imaging (MRI) scanner, a computed tomography (CT) scanner, and an optical imager.

In one configuration, the system further includes a machine learning system to recognize patterns between the material and the resonance characteristics that indicate the presence of the material.

In additional configurations, the RF receiver includes a multi-point receiving antenna, and the processor is further configured to calculate a direction of the material relative to the RF transmitter based on triangulating the response signal received by the multi-point receiving antenna and displaying an indication of the direction of the material.

In one configuration, the processor is further configured to calculate a distance between the RF transmitter and the material using time-of-flight data of the RF signal and the response signal and displaying the distance between the RF transmitter and the material. The processor may be configured to calculate the distance between the RF transmitter and the material using the time-of-flight data by adjusting the time-of-flight data based on media through which the RF signal and the response signal must travel.

In certain configurations, the processor is further configured to calculate a mass of the material based on an amplitude of the response signal and the distance between the RF transmitter and the material and to display the mass of the material. The processor may be configured to calculate the mass of the material by accessing a mass database associating distance, mass, and response signal amplitude for each of the plurality of materials in the material database.

BRIEF DESCRIPTION OF THE DRAWINGS

The accompanying figures are provided by way of illustration and not by way of limitation. The foregoing aspects and other features of the disclosure are explained in the following description, taken in connection with the accompanying example figures relating to one or more embodiments, in which

FIG. 9 illustrates a Mass Database according to an embodiment.

DETAILED DESCRIPTION

Embodiments of the present disclosure will be described more fully hereinafter with reference to the accompanying drawings in which like numerals represent like elements throughout the several figures and in which example embodiments are shown. However, embodiments of the claims may be embodied in many different forms and should not be construed as being limited to the embodiments set forth herein. The examples set forth herein are non-limiting examples and are merely examples among other possible examples.

Figure 1:
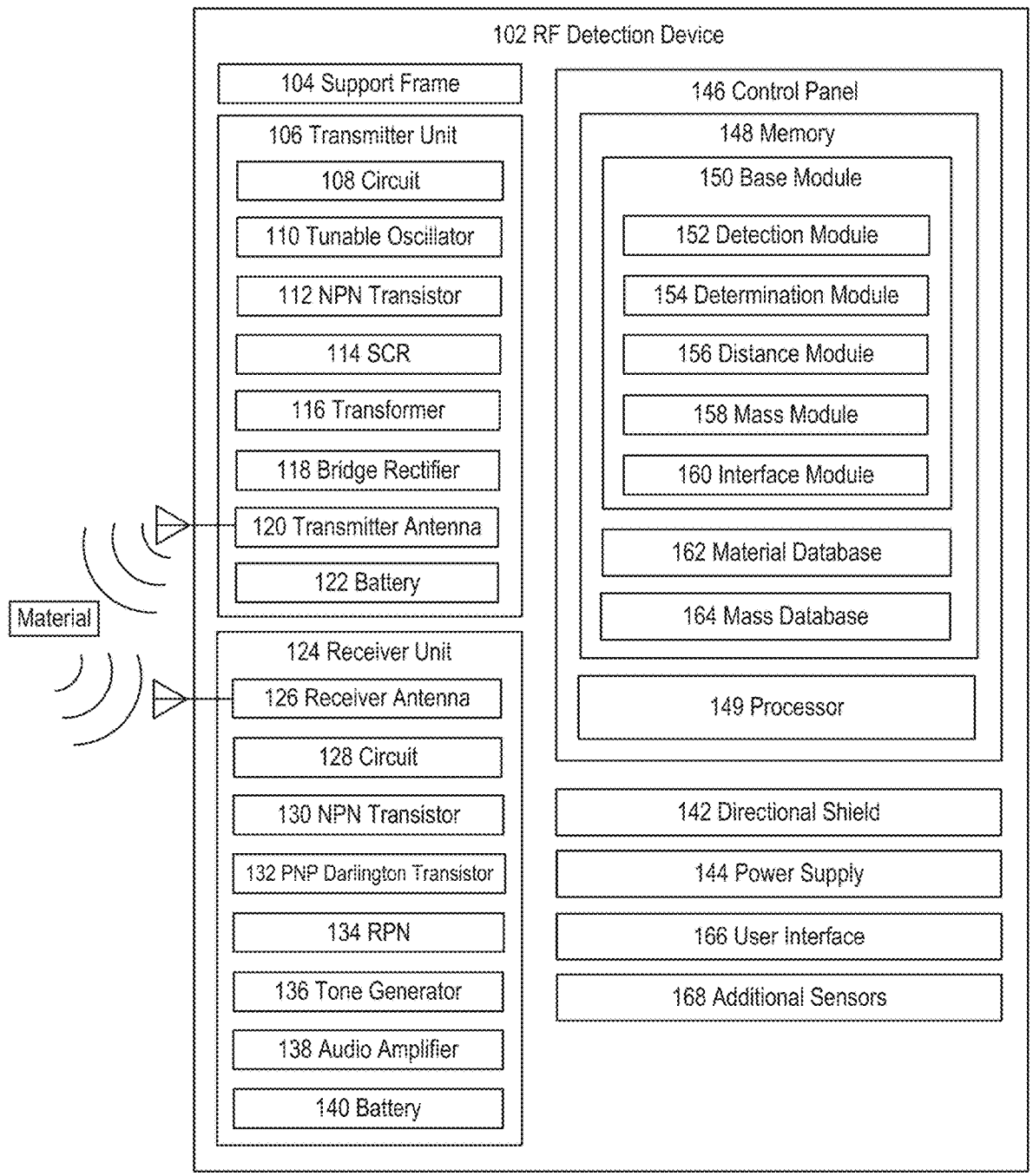
FIG. 1 is a block diagram of an RF detection device according to an embodiment.

FIG. 1 illustrates an RF detection device 102, which may be a specialized system designed to detect and identify specific materials based on their unique resonance frequencies when exposed to electromagnetic signals. The RF detection device 102 includes an RF detection system similar to that disclosed in U.S. Pat. No. 11,493,494, incorporated herein by reference, employing RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification.

The RF detection device 102 may comprise a transmitter unit 106, a receiver unit 124, a control panel 146, a transmitter antenna 120, a receiver antenna 126, a directional shield 142, and a power supply 144. Upon activation, the control panel 146 initializes the system, powering up the transmitter unit 106, the receiver unit 124, and associated electronics. The control panel 146 may instruct the transmitter unit 106 to generate RF signals at specified frequencies, such as, without limitation, 180 Hz, 1800 Hz, etc., and amplitudes, such as, without limitation, 320V, 160V, etc., known to resonate with a target material. The transmitter unit 106 emits these RF signals through the transmit antenna 120 into the testing environment. The receiver unit 124 captures the RF signals (sometimes referred to herein as an "response signal") using the receiver antenna 126. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, the receiver unit 124, antennas 120 126, and control panel 146. The support frame 104 may provide mounting points and secure attachment locations for subsystems such as the transmitter unit 106, the receiver unit 124, antennas 120 126, and control panel 146. By maintaining precise alignment and stability, the support frame 104 may minimize vibrations and unwanted movements that could interfere with the accuracy of RF signal transmission and reception. In some embodiments, the support frame 104 may be constructed from durable materials such as, without limitation, metal alloys or rigid polymers.

Further, embodiments may include a transmitter unit 106, which may include an electronic circuit 108, powered by a battery, such as, without limitation, a 12-volt, 1.2 amp battery, with a regulated output of nine volts. The circuit 108 may use a 555 timer as a tunable oscillator to generate a pulse rate. The output of the oscillator is fed in parallel to an NPN transistor 112 and a silicon-controlled rectifier (SCR) 114. The transistor may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 120. A plurality of resistors and capacitors may fill in the circuit 108. In some embodiments, the transmitter antenna 120 may be formed, e.g., from a coil of about 25 meters of 14-strand wire tightly wound around a one-centimeter PVC core. The transmitter antenna 120 may be, in one exemplary embodiment, in a 1"×3" configuration at the bottom end of the support frame 104. In some embodiments, the transmitter antenna 120 may be shielded approximately 315 degrees with the directional shield 142, formed from aluminum and copper, leaving, e.g., a two-inch opening. Terminal A of the transmitter antenna 120 is switched to ground through the SCR 114. The SCR 114 is "fired" by the output of the 555 timer.

The aforementioned configuration generates a narrow pulsed waveform to the transmitter antenna 120 at a pulse rate as set by the 555 timer. Power is delivered through the 3 W resistor. Frequencies down to 4 Hz are achieved by an RC network containing, e.g., a 100 K pot, a switch, and one of two capacitive paths. The circuit 108 may provide simple RC-controlled timing and deliver pulses to the primary of a step-up transformer 116, the output of which is full-wave rectified and fed to the transmitter antenna 120. The pulse rate is adjustable from the low Hz range to the low kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may comprise one or more analog circuit components, such as, but not limited to, operational amplifiers, op-amps, resistors, inductors, and capacitors. In another example, the digital configuration may comprise one or more digital circuit components, such as, but not limited to, microprocessors, logic gates, and transistor-based switches. In some instances, a given logic gate may comprise one or more electronically controlled switches, such as transistors, and the output of a first logic gate may control one or more logic gates disposed "downstream" from the first logic gate.

Further, embodiments may include a circuit 108, which may be an assembly of electronic components that generate, modulate, and transmit radio frequency (RF) signals. The circuit 108 may include oscillators, amplifiers, modulators, and other components that work together to produce a specific RF signal, which can then be transmitted through the transmitter antenna 120. The circuit 108 may include an oscillator, which generates a stable RF signal at a specified frequency. This frequency is selected based on the resonance characteristics of the target material. For example, the system may operate at 180 Hz or 1800 Hz, depending on the specific requirements of the detection task. Once generated, the RF signal is fed into an amplifier. The amplifier boosts the signal strength to a level suitable for transmission over the required distance. This ensures that the signal can propagate through various media and reach the receiver unit effectively.

Modulation circuits are used to encode information into the RF signal. This may involve varying the amplitude, frequency, or phase of the signal to carry specific data related to the detection process. Modulation ensures that the transmitted signal can be uniquely identified and distinguished from other signals in the environment. The circuit 108 may include power control components that regulate the voltage and current supplied to the oscillator and amplifier. This ensures consistent signal output and helps in managing the power consumption of the device. In some embodiments, the transmitter may operate at voltages such as 160V and 320V, with adjustments made to optimize detection performance. The amplified and modulated RF signal is then routed to the transmitter antenna 120. The transmitter antenna 120 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. By adjusting the control inputs, the frequency of the output signal can be varied, allowing the system to adapt to different detection requirements and environmental conditions. This tuning mechanism may ensure that the oscillator produces a signal at the correct frequency needed for effective resonance with the target materials. By tuning the oscillator to specific frequencies, the system may detect various materials based on their unique resonant properties. The tunable oscillator 110 may work in conjunction with the control panel 146, which sends control signals to adjust the oscillator's frequency as needed. The tunable oscillator 110 may act as the core signal generation component in the transmitter unit 106. When the control panel 146 determines the required frequency for detection, it sends control signals to the tunable oscillator 110. The oscillator then adjusts its frequency, accordingly, generating an RF signal that matches the desired parameters.

The tunable oscillator 110 may be connected to other components within the transmitter unit 106, such as the SCR 114 and the transformer 116. The SCR 114 manages the power supply to the oscillator, ensuring it receives the correct voltage. The transformer 116 steps up the voltage to the appropriate level required by the oscillator.

Further, embodiments may include an NPN transistor 112, which may be a type of bipolar junction transistor (BJT) that includes three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator. The NPN transistor 112 may operate in its active region, where a small input current applied to the base controls a larger current flowing from the collector to the emitter. This amplification process ensures that the RF signal reaches a sufficient power level for effective transmission. In some embodiments, the NPN transistor 112 may also function as a switch, controlling the flow of current within the circuit 108.

When the base-emitter junction is forward-biased, a small voltage is applied, the NPN transistor 112 allows current to flow from the collector to the emitter. This switching action is used to modulate the RF signal, encoding information onto the carrier wave as required for the detection process. Proper biasing of the NPN transistor 112 helps to ensure stable operation. In some embodiments, resistors may be used to establish the correct biasing conditions to ensure that the NPN transistor 112 operates in its linear region for amplification or in saturation/cutoff regions for switching. The biasing circuit ensures that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is used for encoding the detection data onto the transmitted signal, allowing for accurate chemical identification and analysis. In some embodiments, the NPN transistor 112 may be integrated into the circuit 108 or the transmitter unit 106, working in conjunction with other components such as capacitors, inductors, and resistors. This integration ensures that amplification and switching actions of the NPN transistor 112 are synchronized with the overall signal generation and transmission process. The circuit 108 design may leverage the NPN transistor's 112 properties to achieve the desired RF output characteristics.

Further, embodiments may include an SCR 114 or silicon controlled rectifier, which is a type of semiconductor device that functions as a switch and rectifier, allowing current to flow only when a control voltage is applied to its gate terminal. The silicon controlled rectifier, SCR, 114, is utilized within the transmitter unit 106 to manage and control the power delivery to the RF signal generation components. The SCR 114 in the transmitter unit 106 may be employed to control the flow of power to the RF oscillator circuit. By applying a gate signal to the SCR 114, it switches from a non-conductive state to a conductive state, allowing current to pass through and power the oscillator. This control mechanism ensures that the oscillator only receives power when required, thereby conserving energy and preventing unnecessary power dissipation. The SCR 114 may act as a switching element in the transmitter unit 106.

When the control panel 146 determines that the RF signal needs to be generated, a gate voltage is applied to the SCR 114. This triggers the SCR 114 to conduct, completing the circuit and enabling current to flow to the RF oscillator. The SCR 114 may ensure that sufficient current is supplied to the oscillator to produce a strong RF signal without being damaged by the high power levels. The gate terminal of the SCR 114 may be connected to the control panel 146, which manages the timing and application of the gate signal. This integration ensures that the SCR 114 is activated precisely when the RF signal needs to be transmitted, in sync with the overall operation of the detection system. The control panel 146 sends the appropriate signal to the SCR 114, ensuring accurate timing and efficient power usage. The SCR 114 may also serve as a protective component in the transmitter unit 106. By controlling the power flow, it prevents overloading and potential damage to the RF oscillator and other sensitive components. If the system detects any abnormal conditions, the control panel 146 can withhold the gate signal, keeping the SCR 114 in a non-conductive state and thereby cutting off power to protect the circuit.

Further, embodiments may include a transformer 116, which is an electrical device that transfers electrical energy between two or more circuits through electromagnetic induction. The transformer 116 is utilized within the transmitter unit 106 to manage and control the voltage levels required for the RF signal generation and transmission. The transformer 116 in the transmitter unit 106 may be employed to step up or down the voltage as needed to ensure the proper operation of the RF oscillator circuit. By adjusting the voltage levels, the transformer 116 ensures that the components within the transmitter unit 106 receive the appropriate voltage for efficient functioning. The transformer 116 may act as a voltage regulation element in the transmitter unit 106.

When the control panel 146 determines that the RF signal needs to be generated, the transformer 116 adjusts the input voltage to the desired level. This adjustment involves converting the primary winding voltage to a higher or lower voltage in the secondary winding, depending on the requirements of the RF oscillator. The transformer ensures that the oscillator receives a stable and appropriate voltage, which is used for producing a consistent and strong RF signal. The primary winding of the transformer 116 may be connected to the power supply 144, while the secondary winding is connected to the RF oscillator circuit. This integration ensures that the transformer 116 can effectively manage the voltage levels needed for RF signal generation. The control panel 146 monitors and regulates the input voltage to the transformer 116, ensuring accurate and efficient voltage conversion and delivery to the RF oscillator.

Further, embodiments may include a bridge rectifier 118, which is an electrical device designed to convert alternating current (AC) to direct current (DC) using a combination of four diodes arranged in a bridge configuration. The bridge rectifier 118 is utilized within the transmitter unit 106 to ensure that the RF signal generation components receive a steady and reliable DC power supply. The bridge rectifier 118 in the transmitter unit 106 may be employed to convert the incoming AC voltage from the power supply into a DC voltage. By using all portions of the AC waveform, the bridge rectifier 118 provides full-wave rectification, resulting in a more efficient conversion process and producing a smoother and more stable DC output. The bridge rectifier 118 may act as a key power conversion element in the transmitter unit 106.

When the control panel 146 determines that the RF signal needs to be generated, the AC voltage supplied to the transmitter unit is passed through the bridge rectifier 118. The rectifier converts the AC voltage into a DC voltage by directing the positive and negative halves of the AC waveform through the appropriate diodes. This process results in a continuous DC voltage output that is used to power the RF oscillator and other components. The input terminals of the bridge rectifier 118 may be connected to the AC power supply, while the output terminals provide the rectified DC voltage to the RF oscillator circuit. This integration ensures that the bridge rectifier 118 can effectively convert and deliver the required DC power for RF signal generation. The control panel 146 monitors the output of the bridge rectifier, ensuring that the DC voltage is stable and within the desired range for optimal performance.

Further, embodiments may include a transmitter antenna 120, which may be a device that radiates RF signals generated by the transmitter unit 106 towards an environment and/or a specific target material. The transmitter antenna 120 may be designed to efficiently transmit the generated RF signals into the surrounding environment and ensure the signals reach the intended target with minimal loss. The transmitter antenna 120 may be responsible for the emission of RF signals necessary for detecting materials at a distance. In some embodiments, the transmitter antenna 120 may operate within a specific frequency range suitable for detecting the atomic structures and characteristics of the target materials. The frequency range may be determined by the system's requirements and the properties of the materials being detected. In some embodiments, the gain of the antenna may be a measure of its ability to direct the RF energy towards the target. Higher gain antennas focus the energy more effectively, resulting in stronger signal transmission over longer distances. The antenna gain may be optimized for the operational frequency range. In some embodiments, the radiation pattern of the transmitter antenna 120 describes the distribution of radiated energy in space.

For effective material detection, the antenna may have a directional radiation pattern, concentrating the RF energy in a specific direction to enhance detection accuracy. In some embodiments, impedance matching between the transmitter antenna 120 and the transmitter unit 106 may maximize power transfer and minimize signal reflection. Proper impedance matching may ensure efficient operation and reduce losses in the transmission path. In some embodiments, the physical design of the transmitter antenna 120 may include configurations such as dipole, patch, or horn antennas, depending on factors such as frequency range, gain, and environmental conditions. In some embodiments, the transmitter antenna 120 may be integrated with the transmitter unit 106 and other system components through connectors and mounting structures to ensure stable and reliable operation, with considerations for minimizing interference and signal loss.

Further, embodiments may include a battery 122, which may be a type of energy storage device that provides a stable and portable power source for the transmitter unit 106. The battery 122 within the transmitter unit 106 may be utilized to supply the necessary electrical energy to the various components involved in generating and transmitting the RF signal. The battery 122 may be designed to store electrical energy and supply it to the respective components as required. The battery 122 may be rechargeable or replaceable cells capable of providing DC voltage. They are selected based on factors such as voltage output and capacity, which may be measured in ampere-hours (Ah) and size to meet the power requirements of each component effectively. In the transmitter unit 106, battery 122 may serve as a portable power source, enabling the generation and transmission of RF signals without requiring a direct connection to an external power supply. The battery 122 may power various components, such as the tunable oscillator 110, SCR 114, and transformer 116, ensuring continuous operation in various environmental conditions. In some embodiments, the battery 122 used may include lithium-ion, nickel-metal hydride, or other types suitable for portable electronic devices.

Further, embodiments may include a receiver unit 124, which may include the electronic circuit 128. In some configurations, voltage from the receiver antenna 126 passes through, e.g., a 10 K gain pot to an NPN transistor 130 used as a common emitter. The output may be capacitively coupled to a PNP Darlington transistor 132. A plurality of resistors and capacitors fills in the circuit 128. The output is fed through a RPN 134 to a 555 timer that is used as a voltage-controlled oscillator. A received signal of a given amplitude generates an audible tone at a given frequency. In some embodiments, the output is fed to a tone generator, such as a speaker, via a standard 386 audio amp. Sounds can be categorized as "grunts," "whines," and a particular form of whine with a higher harmonic notably present.

In some embodiments, another indicator of a received signal is used, such as light, vibration, digital display, or analog display, in alternative to or in combination with the sound signal. A battery may be used to power the receiver circuit 128. The receiver circuit 128 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and fed to a speaker.

In some embodiments, one or more portions of the receiver unit 124 may be implemented in an analog circuit configuration, a digital circuit configuration, or some combination thereof. In one example, the analog configuration may comprise one or more analog circuit components, such as, but not limited to, operational amplifiers, op-amps, resistors, inductors, and capacitors. In another example, the digital configuration may comprise one or more digital circuit components, such as, but not limited to, microprocessors, logic gates, and transistor-based switches. In some instances, a given logic gate may comprise one or more electronically controlled switches, such as, without limitation, transistors, and the output of a first logic gate may control one or more logic gates disposed "downstream" from the first logic gate.

Further, embodiments may include a receiver antenna 126, which may be a device that captures the RF signals reflected from (or received through) a target material. The receiver antenna 126 may be designed to efficiently receive the received RF signals and transmit them to the receiver unit 124 for further processing and analysis. The receiver antenna 126 may be responsible for capturing the RF signals that have interacted with the target material. In some embodiments, the receiver antenna 126 may be designed to operate within the same frequency range as the transmitter antenna 120 to ensure compatibility and optimal performance for detecting the atomic structures and characteristics of the target materials. In some embodiments, the sensitivity may be a measurement of the receiver antenna's 130 ability to detect weak signals. A highly sensitive receiver antenna 126 may detect low power reflected signals, enhancing the system's detection capabilities. In some embodiments, the noise figure of the receiver antenna 126 may indicate the level of noise it introduces into the received signal. A lower noise figure may be desirable as it ensures that the captured signals are as clean and strong as possible for accurate processing. In some embodiments, proper impedance matching between the receiver antenna 126 and the receiver unit 124 may minimize signal reflection and maximize the power transfer from the antenna to the processing unit to ensure efficient and accurate signal reception. In some embodiments, the directional properties of the receiver antenna 126 may determine its ability to capture signals from specific directions to distinguish signals reflected from the target material versus other sources of interference. In some embodiments, the gain of the receiver antenna 126 may enhance its ability to receive signals from distant targets. Higher gain antennas can improve the system's ability to detect materials at greater distances. In some embodiments, the physical design of the receiver antenna 126 may include various configurations such as dipole, patch, or parabolic antennas and may be based on factors such as frequency range, gain, and the specific detection requirements. In some embodiments, the receiver antenna 126 may be integrated with the receiver unit 124 and other system components through connectors and mounting structures to ensure stable and reliable operation, with considerations for minimizing interference and signal loss.

In some embodiments, the receiver antenna 126 and the transmitter antenna 120 may be a single antenna used by the RF detection device 102. Moreover, embodiments may incorporate multi-point detection capabilities for triangulation. This may involve deploying multiple receiver antennas 126 at different spatial locations around the target area. Each receiver antenna 126 may independently capture RF signals reflected from the target material. The captured signals from the various receiver antennas 126 may then be processed collectively by the receiver unit 124 to determine the exact position of the target material through triangulation techniques. The multi-point detection system may enhance the spatial resolution and accuracy of the detection process, providing precise localization of the target material. In some embodiments, the synchronization of signal capture across the multiple receiver antennas 126 may assist with accurate triangulation, requiring precise timing mechanisms and coordination protocols.

The deployment configuration of the receiver antennas 126 may be adaptable based on the detection environment and the specific requirements of the application, allowing for flexible and scalable system architectures. This approach may also improve the robustness of the detection system against signal interference and noise, as signals from multiple vantage points may be cross-referenced to filter out erroneous detections and enhance overall system reliability. The integration of multi-point detection capabilities may thus significantly elevate the performance and applicability of RF detection devices in various fields, including security, material characterization, and sensing applications.

Further, embodiments may include a circuit 128 within the receiver unit 124, which may be an assembly of electrical components designed to process the received RF signal. The circuit 128 may accurately interpret the RF signals responded or emitted from the target materials and convert them into data that can be analyzed by the RF detection device 102. The circuit 128 in the receiver unit 124 may be employed to handle signal amplification, filtering, demodulation, and signal processing. When an RF signal is received via the receiver antenna 126, it is typically weak and may contain noise or interference. The first stage of the circuit 128 may involve an amplifier that boosts the signal strength to a level suitable for further processing. This amplification ensures that even weak signals can be analyzed effectively.

Next, the circuit 128 may include filtering components that serve to remove unwanted frequencies and noise from the received signal. Filters ensure that only the relevant frequency components of the RF signal are passed through, enhancing the signal-to-noise ratio and improving the clarity of the data. The circuit 128 may also incorporate a demodulator, which extracts the original information-bearing signal from the modulated RF carrier wave. This step interprets the data encoded in the RF signal, allowing the system to identify specific characteristics or signatures of the target materials.

In some embodiments, the circuit 128 may include various signal processing components, such as analog-to-digital converters (ADCs), which convert the analog RF signal into digital data. This digital data may then be processed by the control panel 146 or other computational units within the system for detailed analysis. The signal processing may involve algorithms to detect specific patterns, frequencies, or anomalies that indicate the presence of target materials. The components within the circuit 128 interact seamlessly to ensure accurate and efficient signal processing. For example, the amplified signal from the amplifier is passed to the filter, which cleans up the signal before it reaches the demodulator. The demodulated signal is then digitized by the ADC and sent to the control panel 146 for analysis.

Further, embodiments may include an NPN transistor 130, which may be a three-terminal semiconductor device used for amplification and switching of electrical signals. The NPN transistor 130 may consist of three layers of semiconductor material: a thin middle layer, or base, between two heavily doped layers, or emitter and collector. The NPN transistor operates by controlling the flow of current from the collector to the emitter, regulated by the voltage applied to the base terminal. The NPN transistor 130 integrated into the receiver unit 124 may be designed to process incoming RF signals and may operate in a configuration where the base-emitter junction is forward-biased by a small control voltage provided by the preceding stages of the circuit. The collector of the NPN transistor 130 may be connected to the circuit's supply voltage through a load resistor. When a small current flows into the base terminal, it allows a larger current to flow from the collector to the emitter. This amplification process increases the strength of the received signal, enabling subsequent stages of the circuit to process it more effectively. In the receiver unit 124, the NPN transistor 130 may be employed within amplifier stages where signal gain is crucial. By controlling the base current, the circuit can modulate the transistor's conductivity and thereby regulate the amplification factor. This capability enhances weak RF signals received by the antenna and prepares them for further processing. In some embodiments, the NPN transistor 130 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit.

Further, embodiments may include a PNP Darlington transistor 132, which may be a semiconductor device consisting of two PNP transistors connected in a configuration that provides high current gain. The PNP Darlington transistor 132 integrates two stages of amplification in a single package, where the output of the first transistor acts as the input to the second, significantly boosting the overall gain of the circuit. The PNP Darlington transistor 132 amplifies weak RF signals received by the receiver antenna 126. The incoming RF signal is fed into the base of the first PNP transistor within the Darlington pair. The PNP Darlington transistor 132, due to its high current gain, allows a much larger current to flow from its collector to the emitter compared to the base current. The output from the collector of the first transistor serves as the input to the base of the second PNP transistor in the Darlington pair. The second PNP transistor further amplifies the signal received from the first stage, again with significant current gain.

Further, embodiments may include an RPN 134 or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 134 in the receiver unit 124 may be configured to adjust signal levels received from the antenna and prepare them for further processing. This network includes resistors and potentiometers connected to achieve precise voltage division and attenuation. By adjusting the potentiometers, operators can fine-tune the signal strength and impedance matching, optimizing signal quality for subsequent stages of signal processing. The RPN 134 ensures that incoming RF signals from the receiver antenna 126 are properly attenuated and scaled to match the input requirements of downstream electronics. This calibration process maintains signal integrity and fidelity throughout the reception and decoding process. In some embodiments, the potentiometers within the RPN 134 may allow for manual adjustment of signal parameters such as amplitude and impedance, enabling operators to optimize signal reception based on environmental conditions and operational requirements.

Further, embodiments may include a tone generator 136, which may be a type of electronic device that produces audio signals or tones to alert the user of specific conditions. The tone generator 136 within the receiver unit 124 is utilized to generate audible alerts when the detection system identifies the presence of target materials. The tone generator 136 in the receiver unit 124 may be employed to create specific tones that serve as audible indicators for the user. By generating these tones, the tone generator 136 provides immediate feedback to the operator, signaling the detection of target materials in real time. The tone generator 136 may ensure that the operator is promptly informed of detections without needing to constantly monitor visual displays. The tone generator 136 produces distinct sounds that correspond to different detection events, making it easier for the operator to understand the system's status and respond accordingly. The tone generator 136 may act as an alerting component within the receiver unit 124. When the control panel 146 determines that the RF signal corresponds to a detected target material, it sends a signal to the tone generator 136. This triggers the tone generator 136 to produce a sound, alerting the operator to the detection event.

Further, embodiments may include an audio amplifier 138, which may be a type of electronic device designed to increase the amplitude of audio signals. The audio amplifier 138 within the receiver unit 124 may be utilized to boost the audio signals generated by the tone generator 136, ensuring that the output sound is sufficiently loud and clear for the operator to hear. The audio amplifier 138 in the receiver unit 124 may be employed to enhance the volume and clarity of the audio tones produced by the tone generator 136. By amplifying these audio signals, the audio amplifier 138 ensures that the operator receives audible alerts even in noisy environments, thus improving the overall effectiveness of the detection system. The audio amplifier 138 may act as an intermediary component between the tone generator 136 and the output device, such as a speaker. When the tone generator 136 produces an audio signal, this signal is sent to the audio amplifier 138. The amplifier then boosts the signal's power, making it strong enough to drive the speaker and produce an audible sound. The audio amplifier 138 is connected to other components within the receiver unit 124, including the tone generator 136 and the speaker. It receives the low-power audio signals from the tone generator 136 and amplifies them to a level suitable for driving the speaker.

Further, embodiments may include a battery 140, which may be a type of energy storage device that provides a stable and portable power source for the receiver unit 124. The battery 140 within the receiver unit 124 may be utilized to supply the necessary electrical energy to the various components involved in generating and transmitting the RF signal. The battery 140 may be designed to store electrical energy and supply it to the respective components as required. The battery 140 may be rechargeable or replaceable cells capable of providing DC voltage. They are selected based on factors such as voltage output and capacity, which may be measured in ampere-hours (Ah) and size to meet the power requirements of each component effectively. In the receiver unit 124, batteries provide the necessary electrical energy to receive and process RF signals detected by the antenna. The battery 140 may power components such as amplifiers, filters, and signal processing circuitry, enabling the device to analyze incoming RF signals and extract relevant information. In some embodiments, the battery 140 used may include lithium-ion, nickel-metal hydride, or other types suitable for portable electronic devices.

Further, embodiments may include a directional shield 142, which may be a physical barrier or enclosure designed to direct or block electromagnetic radiation in a specific direction. The directional shield 142 may be constructed from conductive materials, such as metal, to attenuate or reflect RF signals, thereby controlling the propagation of electromagnetic waves. The directional shield 142 may be positioned around the RF oscillator and antenna components and may act as a physical barrier that prevents RF signals from propagating in undesired directions, thereby enhancing the precision and accuracy of signal transmission and reception. During operation, when the transmitter unit 106 generates an RF signal, the directional shield 142 helps to focus and channel this signal towards the intended detection area. By reducing signal dispersion and reflection, the directional shield 142 improves the efficiency of signal transmission and enhances the system's overall sensitivity to detecting RF responses from underground objects or materials.

Further, embodiments may include a power supply 144, such as batteries, serving as the power source for specific components within the RF detection device 102, including the control panel 146. These batteries are designed to store electrical energy and supply it to the respective components as required. The batteries in the control panel 146 may be rechargeable or replaceable cells capable of providing DC voltage. They are selected based on factors such as voltage output and capacity, which may be measured in ampere-hours (Ah) and size to meet the power requirements of each component effectively. In some embodiments, the control panel 146 relies on batteries to maintain functionality for user interface operations, data processing, and communication with other parts of the RF detection device 102. The batteries in the control panel 146 ensure that they remain operational during field use, supporting tasks such as signal monitoring, parameter adjustment, and data transmission. In some embodiments, the batteries used in these components may include lithium-ion, nickel-metal hydride, or other types suitable for portable electronic devices. They are integrated into the design to provide sufficient power capacity and longevity, allowing the RF detection device 102 to operate autonomously for extended periods between recharges or battery replacements.

Further, embodiments may include a control panel 146, which may be a centralized interface comprising electronic controls and displays. The control panel 146 may serve as the user-accessible interface for configuring, monitoring, and managing the RF detection device's 102 operational parameters and data output. In some embodiments, the control panel 146 may be designed to provide operators with intuitive access to control and monitor various aspects of the RF detection device 102. The control panel 146 may allow for the configuration of settings such as signal frequency, transmission power, receiver sensitivity, and signal processing algorithms. In some embodiments, operators may use the control panel 146 to initiate and terminate detection operations, adjust calibration settings, and troubleshoot operational issues.

In some embodiments, the control panel 146 may include a graphical display screen or LED indicators to present real-time status information and measurement results. In some embodiments, input controls such as buttons, knobs, or touch-sensitive panels may enable operators to interact with the device, input commands, and navigate through menu options. The control panel 146 may interface directly with the internal electronics of the RF detection device 102, including the transmitter unit 106, receiver unit 124, antennas 120, 126, and signal processing circuitry. Through electronic connections and communication protocols, the control panel 146 may send commands to adjust operational parameters and receive feedback and status updates from the device. In some embodiments, the control panel 146 may be mounted on the support frame 104 and may provide an operator with control of the RF detection device 102, including adjusting various settings and signaling the operator of a detected material. In some embodiments, a rechargeable battery may power the RF detection device 102, including the transmitter unit 106, the receiver unit 124, and the control panel 146. In some embodiments, multiple batteries may be used. In some embodiments, a tone generator, such as a speaker, may be mounted to the support frame 104 to provide audible signals to the operator for detecting target materials.

Further, embodiments may include a memory 148, which may include suitable logic, circuitry, and/or interfaces that may be configured to store a machine code and/or a computer program with at least one code section executable by a processor 149. Examples of implementation of the memory 148 may include, but are not limited to, Random Access Memory (RAM), Read Only Memory (ROM), Hard Disk Drive (HDD), and/or a Secure Digital (SD) card. The processor may include a suitable processor or processors, such as a microprocessor, microcontroller, field-programmable gate array (FPGA), or application-specific integrated circuit (ASIC).

Further, embodiments may include a number of modules, which may be implemented using any suitable combination of hardware, software, or firmware. Those of skill in the art will recognize that the functionality of any of the described modules may be combined or split into one or more modules in various configurations. For examples, embodiments may include a base module 150, which may sweep through a list of frequencies in order to find which frequencies generate a response from a material. For each frequency, the base module 150 may initiate the detection module 152 to determine if the frequency elicits a response from the material based on its resonant characteristics. The base module 150 may then generate a table of which frequencies elicited a response. The base module may then initiate the distance module 156 to determine the distance of the material based on the time-of-flight of the transmitted and received signal. The base module 150 may then initiate the determination module 154 to compare the table to the material database 162 in order to identify which material or materials are present. The base module 150 may then initiate the mass module to estimate the mass of the material detected based on the intensity of the resonant response, the material's identity, and the distance. The base module 150 may then send all of this data to the interface module 160 to be displayed on the user interface 166 in a user-friendly format. The base module 150 may then cause the RF detection device 102 to rotate and repeat the process. The base module 150 may run continuously, or end after a set amount of rotation.

Further, embodiments may include a detection module 152, which may be responsible for configuring and generating the RF signal through the transmitter unit 106. The detection module 152 may interact with the control panel 146 to set parameters such as frequency and amplitude. Once the RF signal is generated and transmitted via the transmitter antenna 120, the detection module 152 may monitor the receiver unit 124 for RF signal reception. Upon receiving the RF signal via the receiver antenna 126, the detection module 152 processes the signal to extract relevant data about the presence of target materials. This processed data is then sent to the base module 150 for further analysis and decision-making. The detection module 152 operates iteratively as long as the system remains activated, continuously polling and analyzing data to detect and identify target materials based on the received RF signals.

Further, embodiments may include a determination module 154, which may identify the material, or materials present in a sample. The determination module 154 may receive a table of frequencies and responses from the base module 150, which correspond to the frequencies at which resonance with a material was detected. The determination module 154 may then compare that table to the material database 162 to identify materials present in the sample.

Further, embodiments may include a distance module 156, which may determine the distance of the sample based on the time of flight of the transmitted RF wave compared to the received response.

Further, embodiments may include a mass module 158, which may estimate the mass of a known material based on its distance from the RF detection device 102 and the amplitude of the received response. The mass module 158 may refer to the mass database 164 in order to lookup the values of a material at a known distance and mass in order to solve for the unknown mass.

Further, embodiments may include an interface module 160, which may collect and organize the data on detected materials in order to display that data via the user interface 166.

Further, embodiments may include a material database 162, which may contain a list of materials and their associated resonance frequencies. These resonance frequencies are the frequencies of electromagnetic waves emitted from the transmitter antenna 120 that produce a response from the material that can be received by the receiver unit 124.

Further, embodiments may include a mass database 164, which may contain a table of materials and the relationship between mass, distance, and received signal amplitude at known masses and distances. This data is then used to find an unknown mass from a material with a known distance and signal amplitude.

Further, embodiments may include a user interface 166, which may either accept inputs from users or provide outputs to the users or may perform both the actions. In one case, a user can interact with the user interface 166 using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above.

Further, the user interface 166 may either be implemented as a Command Line Interface (CLI), a Graphical User Interface (GUI), a voice interface, or a web-based user-interface. The user interface 166 may display data on detected materials including, but not limited to, the identity of the material, the distance and direction of the material from the RF detection device 102, and the mass of the material at that location.

Further, embodiments may include one or more additional sensors 168, which may provide additional information on the surrounding environment. Example sensors include radar, lidar, a GPS position sensor, humidity sensors, sound sensors, etc. Data from these sensors can augment or inform the data displayed on the user interface. For example, if the user's global location is known, then any detected materials can be overlayed on a map since their distance and direction from the user is known. For another example, if humidity is high, then the time-of-flight calculation for distance may need to be adjusted to account for the slowdown of RF waves caused by water.

Figure 2:
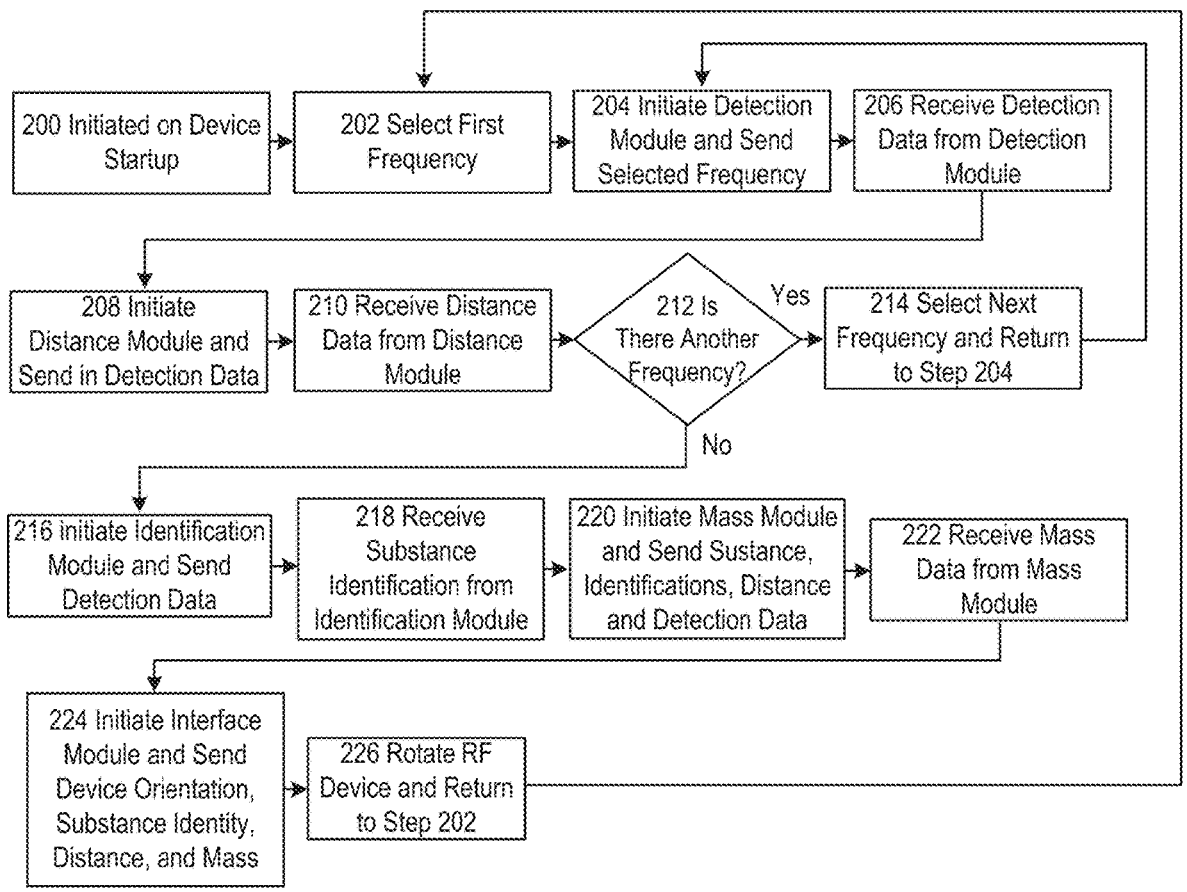
FIG. 2 is a flow chart of a method performed by a Base Module according to an embodiment.

FIG. 2 is a flow chart of a method performed by the base module 150. The base module 150 may be initiated at step 200 when the RF detection device 102 starts up. The base module 150 may also be initiated when a sample is detected or when a user presses a button to begin sample identification. The base module 150 may select at step 202 a first frequency to transmit. This may be selected from a range of frequencies, such as 10-1000 Hz. The range of frequencies may correspond to the range in which the resonant frequencies of the most common materials are found or at which a desired material to be identified is found. The frequencies may be selected in any order, but optimally, the frequencies most likely to resonate with materials of interest may be selected first. For example, if Hydrochloric Acid (HCl) is a material of interest, then its resonant frequency, which may be 180 Hz, may be selected first.

The base module 150 may refer to the material database 162 in order to determine which order to select the frequencies in. Each entry in the material database 162 may have a priority tier associated with a frequency and with an application of the RF detection device 102. For example, for a medical application, materials that indicate cancer, such as Prostate-Specific Antigen and Cancer Antigen 125, may be 1st priority, with unlikely but still dangerous materials such as Uranium being a lower priority. For another example, in a security application, hazardous materials such as Uranium and Nitroglycerin may be 1st priority, whereas while $H_2O_2$ can be used to create explosives it also has legitimate uses as an antiseptic and so is a lower priority. The base module 150 may skip over selecting frequencies for which there is no known material that resonates with that frequency. The base module 150 may initiate at step 204, the detection module 152. The base module 150 may then send the selected frequency to the detection module 152. The detection module 152 may generate an RF signal at the selected frequency through the transmitter unit 106. The detection module 152 may interact with the control panel 146 to set parameters such as frequency and amplitude.

Once the RF signal is generated and transmitted via the transmitter antenna 120, the detection module 152 may monitor the receiver unit 124 for RF signal reception. Upon receiving the RF signal via the receiver antenna 126, the detection module 152 processes the signal to extract relevant data about the presence of target materials. This processed data is then sent to the base module 150 for further analysis and decision-making. The base module 150 may receive at step 206 detection data from the detection module 152. Detection data may be a simple binary indication if the transmission frequency produced a resonance response from the sample. For example, the data may indicate there was a resonance response at 180 Hz but no resonance response at 181 Hz. In some embodiments, detection data may include the detected response signal. Detection data may also include the time-of-flight of the signal and response. This data is used by the distance module to calculate distance. If the data from the detection module 152 is complex, then the base module 150 may also undertake data processing steps such as cleaning, formatting, reduction, and analysis.

The base module 150 may initiate the distance module 156 and send in the detection data. The distance module 156 may determine the distance of the sample based on the time-of-flight of the transmitted RF wave compared to the received response. The detection data may include this time-of-flight data. The base module 150 may receive distance data from the distance module 156. For example, a material detected with a frequency of 10 Hz may be at a distance of 10 m. The base module 150 may determine at step 212 if another frequency has not yet been selected. In some embodiments, certain frequencies may be selected multiple times to improve the confidence level of the detection data for those frequencies. The base module 150 may include a smart frequency selection algorithm, which may select the next frequency based on an optimized selection pattern. For example, if a material was detected at a certain frequency, the selection algorithm may cause the base module 150 to select the next frequency where that same material would be detected to quickly confirm the presence of the material. Likewise, if a material was not detected at its expected frequency, other resonant frequencies for that material may not be selected at all. If another frequency has not yet been selected, the base module 150 may select at step 214, the next frequency and return to step 204. If each frequency in the frequency range has been selected, the base module 150 may initiate at step 216 the determination module 154 and send in the detection data for each selected frequency. This may be a list of which selected frequencies produced any response at all or a data table of selected frequencies and their associated received resonance response or lack thereof.

The determination module 154 may compare the received detection data to the material database 162 to identify materials present in the sample. The base module 150 may receive at step 218 material identification or identifications from the determination module 154. For example, the determination module 154 may identify HCl and Uranium in the direction the RF detection device 102 is pointed. The base module 150 may initiate at step 220 the mass module 158 and send in the material identifications, distance data, and detection data. The mass module 158 may estimate the mass of a known material based on its distance from the RF detection device 102 and the amplitude of the received response. The mass module 158 may refer to the mass database 164 in order to lookup the values of a material at a known distance and mass in order to solve for the unknown mass. The base module 150 may receive at step 222 mass data from the mass module 158. For example, the mass module 158 may send data that indicates that the mass of a deposit of Uranium 100 m away has a mass of 4 kg.

The base module 150 may initiate at step 224 the interface module and send in the current orientation of the RF detection device 102, the identities of the detected materials, the distance of those materials from the RF detection device 102, and the mass of those materials to the interface module 160. The interface module 160 may collect and organize the data on detected materials in order to display that data via the user interface 166. Device orientation may be the heading of the RF detection device 102. This maps a sector of a circle that the RF detection device 102 is transmitting to and receiving from. With multi-point detection, the angular location of each detected material within that sector can be further refined. For example, if the current orientation of the RF detection device 102 covers a sector from 15 degrees to 30 degrees east of due north, then using triangulation from the multi-point receiver antenna 126, the location of a material can be narrowed down to 23 degrees east of due north. The base module 150 may rotate at step 226 the RF detection device 102 and return to step 202. The base module 150 may command the control panel 146 to cause the support frame 104 to turn about an axle. Each turn of the RF detection device 102 may overlap or not overlap with the last transmission angle. When the RF detection device 102 has made a full rotation the base module 150 may end or may continue to cause rotation until ended by other means.

The functions of the RF detection device 102 may be integrated with other devices, such as medical devices, in order to provide a more robust workflow and to aid in early detection of cancer and other diseases. In addition to its normal functions, the RF detection device 102 may also utilize advanced imaging techniques such as hyperspectral imaging, terahertz radiation, or molecular spectroscopy to detect cancerous tissues. Once the RF detection device 102 detects potential cancerous tissues, it may analyze the data to determine the probability of cancer presence. This may involve machine learning algorithms trained on vast datasets of cancerous and non-cancerous tissue images. The RF detection device 102 may provide a probabilistic assessment of cancer based on this analysis. The RF detection device 102 may be integrated into a clinical workflow as a preliminary screening tool. Patients at risk or those exhibiting symptoms could undergo a non-invasive scan using this device. Alternatively, the RF detection device 102 may continuously monitor an area, such as a hospital wing, and alert medical professionals if cancer indicators are detected. The size of the monitored area may be based on the range and accuracy of the RF detection device 102. Based on the probability scores generated, the RF detection device 102 may recommend further diagnostic tests. For example, the RF detection device 102 may suggest a blood test to detect circulating tumor cells (CTCs) or specific cancer markers like CA 15-3 for breast cancer, PSA for prostate cancer, or others relevant to the suspected cancer type. For another example, if the detected indicator is clustered in one dense area the RF detection device 102 may suggest Fine Needle Aspiration (FNA), which involves using a thin needle to extract cells from a suspicious area for cytological examination. The RF detection device 102 may interface with existing electronic health records (EHR) systems, allowing for automatic updating of patient records with scan results and recommendations.

Figure 3:
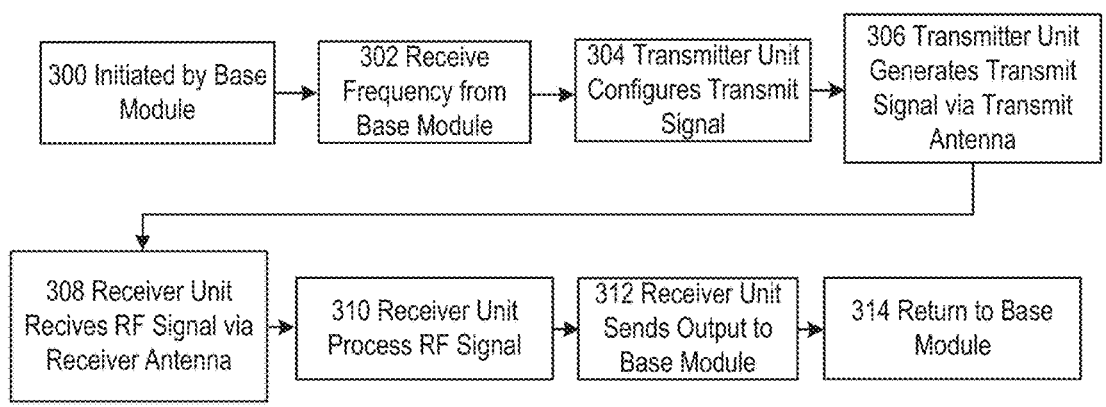
FIG. 3 is a flow chart of a method performed by a Detection Module according to an embodiment.

FIG. 3 is a flowchart of a method performed by the detection module 152. The detection module 152 may be initiated at step 300 by the base module 150. In some embodiments, the detection module 152 may be initiated by the user or operator through the control panel 146. The detection module 152 receives at step 302 the selected frequency from the base module 150. The detection module 152 may command at step 304 the transmitter unit 106 to configure the transmit signal. The transmitter unit 106 prepares the signal that will be transmitted at the selected frequency. In some embodiments, the parameters and components may be set up with the desired characteristics to generate the RF signal. The control panel 146 determines the specific parameters of the RF signal that need to be generated. Once the parameters are set, the control panel 146 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114.

When the control panel 146 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the requirements of the transmit antenna 120. It may also provide impedance matching to ensure efficient signal transmission. The transformer 116 ensures that the RF signal is at the appropriate voltage and current levels for optimal transmission. For example, the control panel 146 may determine that an RF signal with a frequency of 50 Hz requires a specific power level. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, ensuring it is at the correct voltage level for transmission.

The detection module 152 may command at step 306 the transmitter unit 106 to generate the transmit signal via the transmit antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A response wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The detection module 152 may record the time the signal was transmitted.

The detection module 152 may command at step 308 the receiver unit 124 to receive RF signal via receiver antenna 126. The receiver unit 124 captures the RF signal that has interacted with the environment and potential target materials using the receiver antenna 126. The receiver antenna 126 captures the incoming RF signal, which has been transmitted by the transmitter unit 106 and has interacted with the environment and any target materials present. The receiver antenna 126 may be designed to effectively capture these radio waves and convert them back into electrical signals.

Once the RF signal is received by the receiver antenna 126, it may be fed into an RF amplifier, which boosts the signal strength without significantly altering its characteristics. In some embodiments, the use of the standard atomic structure of a material may be used to calculate the resonant frequency to which a particular material would generate or respond. Each element and material comprises a definable atomic structure composed of the total number of protons and neutrons of that target material. This unique nuclear composition of every material makes it uniquely identifiable and detectable. The manner in which this information is applied thus enables the detection of any target material. A target material can be detected and located based on a resonant, responsive RF wave and/or magnetic relationship between the target and a transmitter antenna 120 transmitting at the frequency specific and unique to the target material. The transmitter unit 106, through the transmitter antenna 120, induces a resonance due to responsive RF waves and/or magnetic and/or otherwise in a targeted material to resonate at a specific computed frequency.

The receiver antenna 126 and receiver circuit 128 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the material, the number of protons, the number of neutrons, or the atomic mass, such as the sum of protons and neutrons and combinations thereof. The frequency can be transmitted at varying voltages to compensate for other external effects or interference.

In some embodiments, a table or database of characteristics of common materials may be used to calculate the resonant frequencies. To accomplish this tuning, the frequency of the signal from the transmitter antenna 120 is set to some harmonic of the elements of the material. The detection module 152 may record the time the signal was received. This can be compared to the time the signal was transmitted to calculate a time-of-flight. The receiver antenna 126 may have multi-point detection capabilities in order to triangulate the location of the responding material. The detection module 152 may command at step 310 the receiver unit 124 to process the RF signal. The receiver unit 124 processes the received RF signal to extract meaningful data that can be analyzed for the presence of specific materials, which may involve further amplification, filtering, digitization, and initial data processing before the signal is sent to the control panel 146 for detailed analysis.

In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter (ADC). The ADC samples the analog signal at a high rate and converts it into a series of digital values. The digitized signal may be processed using digital techniques. The digital signal may be fed into a Digital Signal Processor (DSP) within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying key characteristics of the signal that are indicative of the presence of target materials.

The detection module 152 may command at step 312 the receiver unit 124 to send the output to the base module 150. The resultant data from the process is organized and packaged, which may involve structuring the data into packets, adding metadata such as timestamps and identifiers, and incorporating error-checking codes to ensure data integrity during transmission. The data may be a binary indication of whether or not a resonance response was detected by the receive antenna 126. Alternatively, some or all of the received signal data may be sent to the base module 150. The detection module 152 may return at step 314 to the base module 150.

Figure 4:
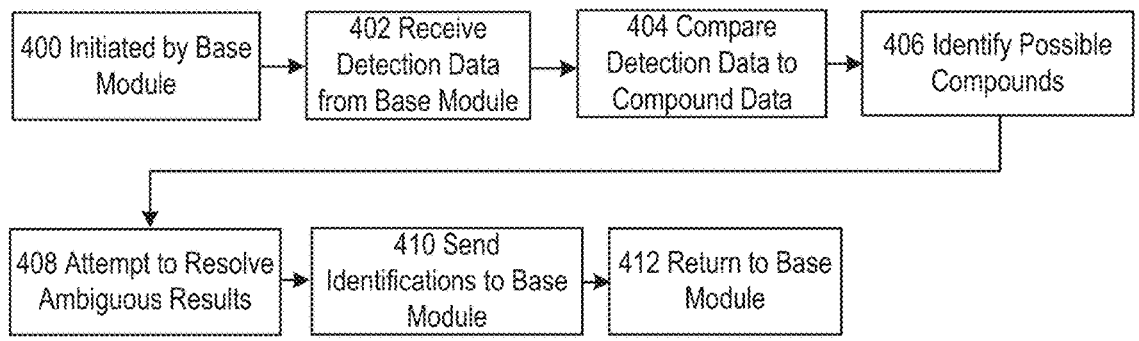
FIG. 4 is a flow chart of a method performed by a Determination Module according to an embodiment.

FIG. 4 is a flow chart of a method performed by the determination module 154. The determination module 154 may be initiated at step 400 by the base module 150. The determination module 154 may receive at step 402 detection data from the base module 150. This may be a list of which selected frequencies produced any response at all or a data table of selected frequencies and their associated received resonance response. The determination module 154 may compare at step 404 the detection data to the material database 162. For example, if the detection data showed a response at 180 Hz, 340 Hz, and 1160 Hz, then the determination module 154 would search the material database 162 for any entries with those frequencies. The determination module 154 may identify at step 406 the possible materials in the sample. These would be any materials or elements that have resonant frequencies that correspond to the frequencies in the detection data. For example, given that there was a response at the frequencies 180 Hz, 340 Hz, and 1160 Hz, then the possible materials in the sample would be $H_2O_2$, HCl, and Nitroglycerin ($CH_2NO_3CHNO_3CH_2NO_3$) based on the data in the material database 162.

The determination module 154 may attempt at step 408 to resolve any ambiguous results. Since some materials may share similar features, such as total atomic weight or number of protons, they may have similar or identical resonant frequencies. In ambiguous cases, the determination module 154 may be able to identify which material is present based on the material's other resonance frequencies. For example, $H_2O_2$ and HCl have a resonance frequency of 180 Hz, which does appear in the detection data. However, 340 Hz also had a response, which corresponds to $H_2O_2$ and not HCl, which means $H_2O_2$ is likely present.

To address ambiguities, further methods may include conducting additional scans using secondary (or tertiary or additional) resonance frequencies specific to the materials in question. For example, two materials (A and B) may be associated with the same resonance frequency ($F_0$). The response signal for resonance frequency $F_0$ may be stronger (i.e., have a greater amplitude) for material A than for material B. However, detection of resonance characteristics in the response signal for resonance frequency $F_0$ may not clearly differentiate between material A and material B. Consider that material A may also exhibit resonance characteristics for resonance frequency $F_1$, which may not be the case for material B. Therefore, if resonance characteristics are for $F_0$ are detected, the system may repeat the process with resonance frequency $F_1$ to determine whether material A or material B has been detected. In some cases, the differences in signal strength at various frequencies may exhibit sufficient characteristic variations across their resonance frequencies in order to clearly distinguish between materials A and B.

Another disambiguation method may include incorporating environmental and/or contextual data to refine a likelihood of specific materials being present. Environmental data may include any data relating to external conditions that could affect the resonance response. The environment data could include, without limitation, temperature, pressure, humidity, background electromagnetic interference levels, and the like, which may not impact the resonance response for certain materials (or conditions), but may be an impact for other materials (or conditions). Contextual data may include anything outside of environmental, such as the time and location of the measurement, or other sensor measurements. This contextual data could be used to improve accuracy in a number of ways. In a medical setting, for example, all the information in the patient's electronic health record could be contextual data that could be used to resolve ambiguities. For example, if the patient has a medical implant, the location of that implant could be contextual data used to more accurately locate the cancer cells being searched for/detected.

Yet another disambiguation method may include using data from at last one other sensing modality to provide additional data points that can help resolve ambiguities in RF detection. For example, if a material is being analyzed, but there is ambiguity, the material could be put into a mass spectrometer, which may rule out (or suggest) certain materials and/or refine data regarding the resonance response. Still other sensing modalities may include an x-ray diffraction analyzer, an x-ray fluorescence analyzer, a magnetic resonance imaging (MRI) scanner, a computed tomography (CT) scanner, and an optical imager (e.g., camera). The optical imager could be used to identify a material through object recognition, such as a gun, and that image can be compared to the detector's identification of where it found gunpowder.

Another disambiguation technique may include analyzing the time-resolved response of the material to the RF signals as different materials sometimes exhibit unique time-based resonance patterns (e.g., analyzing a timing of responsive RF signals from the material).

Still other disambiguation techniques may include cross-referencing findings with multiple databases to increase the reliability of material identification. For example, the RF detection device 102 may be associated with a first material database 162 produced by a first source via experimentation and/or machine learning. If the RF detection device 102 produces ambiguous readings using the first material database 162, it may access a second material database 162 produced by a second source, which may generate an unambiguous result or may be used in combination with results based on the first material database 162 for disambiguation purposes.

In various embodiments, the RF detection device 102 may implement or have access to machine learning algorithms to recognize complex patterns in the resonance data that could indicate specific materials even in the presence of ambiguous signals. The machine learning algorithm be supervised, semi-supervised, self-supervised, unsupervised, and/or use reinforcement learning to discover relationships between resonance data and various materials. In some embodiments, the machine learning algorithm may implement one or more deep learning algorithms, such as convolutional neural networks (CNNs), recurrent neural networks (RNNs), feedforward neural networks (FNNs), radial basis function networks (RBF networks), generative adversarial networks, or the like.

The foregoing methods may enhance the accuracy and reliability of material identification by providing multiple layers of verification and cross-checking. Some ambiguities, however, may not be resolved by the determination module 154 and may be sent to the base module 150 as an ambiguous identification for further differentiation. The determination module 154 may send at step 410 all identified materials and/or elements to the base module 150. The determination module 154 may return at step 412 to the base module 150.

Figure 5:
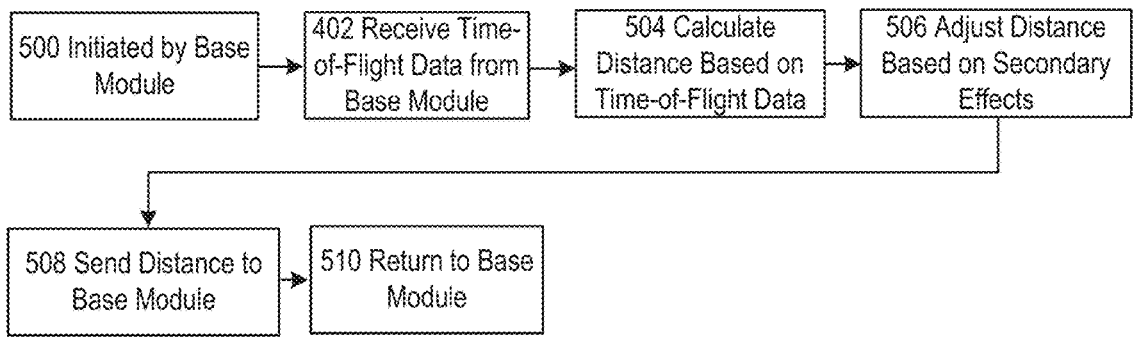
FIG. 5 is a flow chart of a method performed by a Distance Module according to an embodiment.

FIG. 5 is a flow chart of a method performed by the distance module 156. The distance module 156 may be initiated at step 500 by the base module 150. The distance module 156 may receive at step 502 time-of-flight data from the base module 150. This is the data on the time between the emission of the transmission signal and the received response from the resonant material. The distance module 156 may calculate at step 504 distance to the resonant material based on the time-of-flight data. The distance may be given by the equation distance=$(c \times \Delta t)/2$ wherein c is the speed of light, and $\Delta t$ is the time-of-flight. The numerator is divided by two because the signal needs to first reach the material, then relay back to the RF detection device 102.

The distance module 156 may use additional beneficial calculations including measuring signal strength to determine the power of the received signal and estimate the distance and size of the resonant material by measuring the amplitude of the received RF signal; analyzing sideband frequencies to identify other frequencies produced due to interactions with nearby materials or signal interference by analyzing the frequency spectrum around the primary resonance frequency; calculating phase differences to determine the relative position of the detected material by measuring the phase shift between transmitted and received signals;

checking frequency stability to ensure the accuracy of the detection frequency by continuously monitoring and adjusting for any drift; applying environmental compensation to adjust calculations based on factors such as temperature, humidity, and pressure, which affect RF propagation, by using sensors to measure environmental conditions and applying compensation algorithms; estimating material density by combining signal strength and distance measurements to calculate the probable density of the material; reducing noise to enhance detection accuracy by applying advanced noise reduction algorithms and filters to the received signal before processing; and analyzing Doppler shifts to determine the relative movement of the detected material by analyzing changes in frequency due to the Doppler effect.

The distance module 156 may adjust at step 506 the calculated distance based on secondary effects. These effects may include the movement of the RF detection device 102 between signal transmission and reception, the movement of the earth, the movement of the detected material, the presence of mediums besides air which may change the speed of light, or any other effect which may require an adjustment to the calculated distance. For example, the speed of light in air is approximately 300,000 km per second, but the speed of light in water is only about 75% of that speed (approx. 225,000 km/s). Which means if the material is underwater, within a human body, or if there is a large body of water between the material and the RF detection device 102, the distance may need to be reduced to compensate for the longer time-of-flight. The distance module 156 may send at step 508 the calculated distance to the base module 150. The distance module 156 may return at step 510 to the base module 150.

Figure 6:
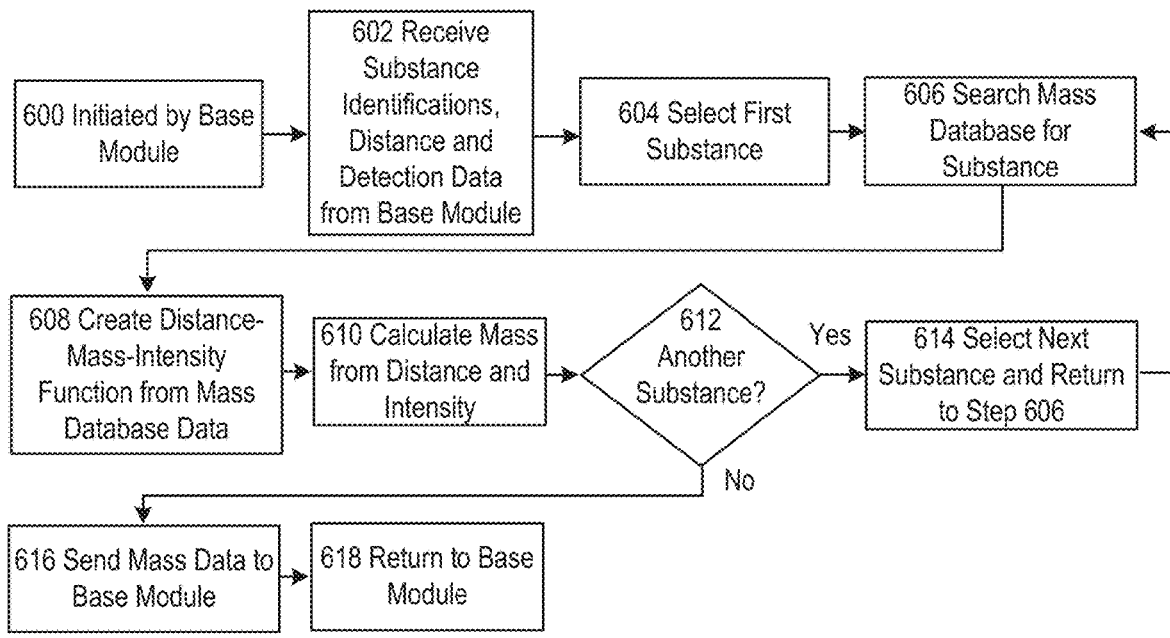
FIG. 6 is a flow chart of a method performed by a Mass Module according to an embodiment.

FIG. 6 is a flow chart of a method performed by the mass module 158. The mass module 158 may be initiated at step 600 by the base module 150. The mass module 158 may receive at step 602 material identifications, distance data, and detection data from the base module 150. This data may contain the identity of the materials, the distance of the materials, and the intensity of the resonance signal from the materials. For example, HCl was detected at a distance of 100 m and with a signal intensity of 4.5 dB, and Uranium was detected at 1000 m with a signal intensity of 10 dB. The mass module 158 may select at step 604 the first of the detected materials. The mass module 158 may search at step 606 the mass database 164 for the selected material. The mass database 164, as shown in FIG. 9, contains known values for the mass, distance, and signal intensity of a material. The mass module 158 may create at step 608 a distance-mass-intensity function for the material from the data in the mass database 164. Signal intensity is likely directly proportional to the mass of the material and inversely proportional to the square of the distance. Giving an equation such as $I=(k*m)/d^2$, where I is signal intensity, m is mass, d is distance, and k is a constant unique to the material. However, some materials may not behave ideally and the mass module 158 may need to derive a best-fit function for the data points in the mass database. For example, Uranium is highly radio-active and so as the mass of a group of a Uranium atoms increases particle interactions become more frequent. These interactions could interfere with the resonance properties of the Uranium, meaning that the unique value k would no longer be constant but instead would change with the amount of material.

The mass module 158 may calculate at step 610 the mass of the selected material by inputting the distance and signal intensity into the function and solving for mass. In some embodiments, the mass function may be applied to the signal waveform as a whole, creating a mass density map. This may be useful when many smaller masses are expected, or the shape of the mass is important. For example, when looking for Prostate-Specific Antigen (PSA) in a human body, smaller pockets of this antigen may exist naturally but not indicate cancer. Therefore, simply looking at the total mass within the detection area of the RF detection device 102, may not be helpful. Instead creating a mass density map to find local areas of high mass may be more useful. This high-definition method may not be practical when detecting deposits of a material, such as uranium, over long distances.

Additional calculations can be integrated into step 610 to enhance diagnostic capabilities, especially in the context of medical diagnostics for cancers and other diseases. Shape estimation may determine the geometric shape of tumors or abnormal growths by analyzing the spatial distribution of signal intensities across different detection points. Size estimation may calculate the physical size of tumors or abnormal tissues by combining distance and signal strength data. Density calculation may determine the density of the detected tissue by using mass and volume estimates. The signal-to-noise ratio (SNR) may evaluate the quality of the signal by measuring the signal strength relative to the background noise level. Resonance quality factor (Q-Factor) may assess the sharpness of the resonance by analyzing the bandwidth of the resonance peak. Phase shift analysis may determine the phase difference between the transmitted and received signals by measuring and comparing the phase angles. Harmonic content analysis may detect harmonics generated by the tissue by performing a Fourier transform on the signal to identify harmonic frequencies. Temporal stability may monitor changes over time by continuously measuring and comparing signal characteristics. Material composition analysis may infer possible composite tissues by analyzing multiple resonance frequencies and comparing detected frequencies with known tissue composites in the material database. Environmental compensation may adjust calculations based on environmental conditions such as temperature, humidity, and pressure by using data from environmental sensors to correct signal measurements. The mass module 158 may determine at step 612 if there is another material for which mass has not yet been calculated. If there is another material, the mass module 158 may select at step 614 the next material and return to step 606. If there are no other materials, the mass module 158 may send at step 616 the mass of each material to the base module 150. The mass module 158 may return at step 618 to the base module 150.

Figures 7, 8:
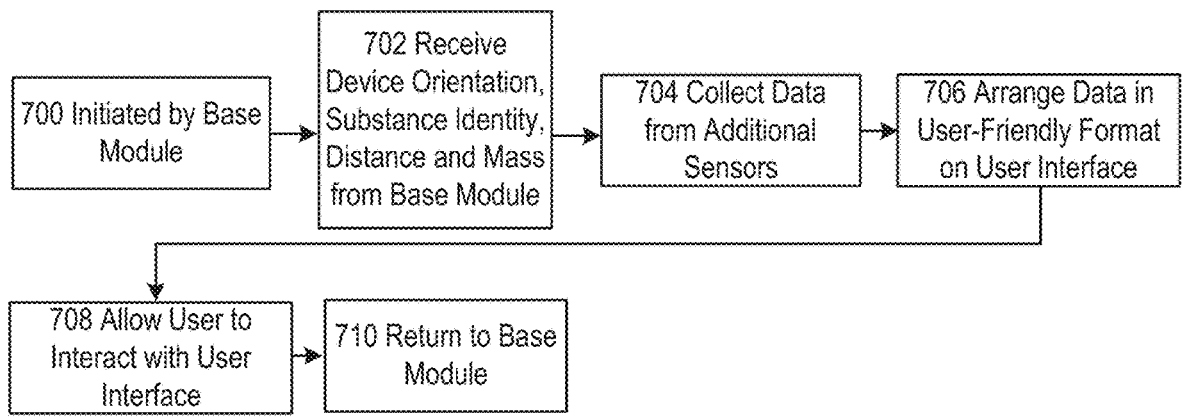
FIG. 7 is a flow chart of a method performed by an Interface Module according to an embodiment.
FIG. 8 illustrates a Material Database according to an embodiment.

FIG. 7 is a flow chart of a method performed by the interface module 160. The interface module 160 may be initiated at step 700 by the base module 150. The interface module 160 may receive at step 702 the current orientation of the RF detection device 102, the identities of the detected materials, the distance of those materials from the RF detection device 102, and the mass of those materials from the base module 150. The interface module 160 may also be updated with new data each time the base module 150 sends data. The interface module 160 may collect at step 704 data from one or more additional sensors 168. For example, global position may be collected from a GPS position sensor, the location of surrounding objects may be collected from a lidar sensor, and ambient sound may be collected from a sound sensor. This data may be added to and/or complement the data from the base module 150. For example, if the user's global location is known, then any detected materials can be overlayed on a map since their distance and direction from the user is known.

The interface module 160 may arrange at step 706 the data in a user-friendly format and display the data via the user interface 166. In an embodiment the detected materials may be displayed on a polar coordinate graph, similar to a radar interface. Each node on the graph would correspond to a detected material and contain data on the material's identity, location, and mass. As the RF detection device 102 sweeps around in a circle the graph would be updated, similar to a radar interface. In some embodiments this polar graph would be overlayed on a GPS map so that the longitude and latitude of the material could be seen. In another embodiment, the data may be displayed via a chart of materials with their associated distance, direction, and mass. In some embodiments, the nodes may be overlayed on a diagram of the human body so that medical personnel can see where in the body those materials are found.

The interface module 160 may allow at step 708 the user to interact with the user interface 166. For example, if the interface displays nodes where materials are but does not further display data on the materials, the user may be able to touch, click, or hover over the node with a cursor in order to see more detail such as mass and distance. The interface module 160 may return at step 710 to the base module 150. The interface module 160 may not return to the base module 150 until the user is finished viewing and interacting with the user interface 166. In which case the interface module 160 may continue to be updated with new data from the base module 150.

In another embodiment Augmented Reality (AR) Overlay is used. The interface module 160 may initiate at step 700 by the base module 150, receiving data at step 702 about the RF detection device 102's orientation, detected material identities, their distances, and masses. This data can be updated continuously. The interface module 160 at step 704 collects additional sensor data, such as GPS, lidar, and sound. This information may be displayed through AR glasses or a mobile device, where detected materials appear as virtual objects in the user's real-world view. For example, hazardous materials in a warehouse would be highlighted with visual indicators showing their type, exact location, and mass, allowing for real-time, intuitive navigation.

In another embodiment, 3D Interactive Maps are used. The interface module 160 starts at step 700, receiving orientation, identity, distance, and mass data from the base module 150 at step 702. Additional sensor data, such as GPS and lidar, is collected at step 704. This data is arranged in a 3D interactive map format at step 706. Users can navigate this map using touch gestures or a mouse, viewing detected materials as 3D objects within a virtual space. Clicking on an object reveals detailed information about the material, including its mass and distance from the RF detection device 102. This interface helps in visualizing the spatial distribution of materials in complex environments like industrial plants.

In yet another embodiment, a Voice-Activated Interface is used. The interface module 160 may receive data from the base module 150 at step 702 and additional sensor data at step 704. This data is formatted for voice interaction at step 706. Users can query the system using voice commands to get information about detected materials. For example, asking "What materials are nearby?" would prompt the system to list detected materials along with their identities, distances, and masses. The interface may also provide audible alerts if hazardous materials are detected, enhancing hands-free operation in dynamic environments such as construction sites.

In still another embodiment, a Wearable Device Display is used. At step 700, the interface module 160 receives data from the base module 150, including orientation, identity, distance, and mass of detected materials. Additional data from sensors like GPS is collected at step 704. This information is displayed on a wearable device, such as a smartwatch, at step 706. The device shows a simplified chart or list of detected materials, with icons indicating their relative positions and masses. Users can tap on the display to see more detailed information or receive haptic feedback alerts when specific materials are detected nearby.

In another embodiment, Dashboard Interface for Vehicle Integration is used. The interface module 160, initiated at step 700, receives and updates data from the base module 150 at step 702 and additional sensors at step 704. This data is displayed on a vehicle's dashboard screen at step 706, providing a comprehensive overview of detected materials around the vehicle. The display can show a radar-like interface with nodes representing materials, their identities, distances, and masses. In a crane operation, for example, this interface helps the operator detect and avoid hazardous materials during loading and unloading. Touch or voice commands allow interaction with the display, providing detailed information about specific materials.

Each of these interfaces ensures that the user can interact with and interpret the data collected by the RF detection device 102 and additional sensors effectively, enhancing situational awareness and decision-making in various environments.

FIG. 8 illustrates an example of the material database 162. The material database 162 may contain a list of materials and their associated resonance frequencies. These resonance frequencies are the frequencies of electromagnetic waves emitted from the transmitter antenna 120 that produce a response from the material that can be received by the receiver unit 124. The frequency at which an element resonates may be based on the number of protons, number of neutrons, and/or atomic mass (sum of protons and neutrons) for the element. For example, the selected frequencies for Arsenic (As) may be 33 Hz (based on number of protons), 42 Hz (based on number of neutrons), and 75 Hz (based on atomic mass). These frequencies can also be increased by one or more orders of magnitude (10×, 100×, etc.). Similarly, the frequencies for a material may be based on the sum total of the constituent parts. For example, a Hydrogen Peroxide ($H_2O_2$) molecule has a combined total of 18 protons (corresponding to a frequency of 18 or 180 Hz) and a mass of 34 (corresponding to a frequency of 34 or 340 Hz). Individual scans using two or more of these frequencies can be used to uniquely identify the element or material. Note that these frequencies are examples. The actual frequencies at which materials and elements resonate may be determined by physics models and/or experimentation.

The material database may further contain priority tiers for specific applications. These priority tiers may determine in which order frequencies are selected for testing. For example, application A may be a medical application wherein Arsenic and $H_2O_2$ would be a high priority due to the toxicity of Arsenic and $H_2O_2$. Uranium, while also deadly, is unlikely to be found in the human body and is therefore a lower priority. For another example, application B may be a security checkpoint wherein Uranium and Nitroglycerin ($CH_2NO_3CHNO_3CH_2NO_3$) are high priority due to the damage they can cause to others. Arsenic, while still deadly, is unlikely to cause mass damage or death because it is noncombustible and not highly radioactive.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The systems and methods described herein can be implemented in hardware, software, firmware, or combinations of hardware, software and/or firmware. In some examples, systems described in this specification may be implemented using a non-transitory computer readable medium storing computer executable instructions (e.g., program code) that when executed by one or more processors of a computer cause the computer to perform operations. Computer-readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

Numerous examples are provided herein to enhance understanding of the present disclosure. A specific set of statements is provided as follows.

Statement 1. A method for material detection and identification, the method comprising: accessing a material database associating each of a plurality of materials with one or more corresponding resonance frequencies; and for each material of at least a subset of the plurality of materials in the material database: transmitting into an environment an RF signal at a first resonance frequency for the material; receiving a response signal from the environment; analyzing the response signal for resonance characteristics that indicate a presence of the material; and identifying the material to a user if the presence of the material is indicated by the resonance characteristics.

Statement 2. The method of statement 1, wherein the material database indicates a priority of detecting each material of the at least the subset of materials for one or more applications, and wherein transmitting includes transmitting into the environment the RF signal at the first resonance frequency for each material in order of the priority for a specific application.

Statement 3. The method of statements 1-2, wherein the at least the subset of the plurality of materials is selected by the user.

Statement 4. The method of statements 1-3, further comprising, if no materials are identified or ambiguous resonance characteristics are detected, repeating the steps of transmitting, receiving, analyzing, and identifying using a second resonance frequency for one or more of the materials in the material database.

Statement 5. The method of statements 1-4, further comprising, if no materials are identified or ambiguous resonance characteristics are detected, incorporating at least one of environmental or contextual data to refine a likelihood of specific materials being present.

Statement 6. The method of statements 1-5, further comprising, if no materials are identified or ambiguous resonance characteristics are detected, analyzing at least one of a timing of receipt or amplitude of the response signal.

Statement 7. The method of statements 1-6, further comprising, if no materials are identified or ambiguous resonance characteristics are detected, repeating the steps of transmitting, receiving, analyzing, and identifying using one or more different materials databases.

Statement 8. The method of statements 1-7, further comprising, if no materials are identified or ambiguous resonance characteristics are detected, integrating input from at least one other sensing modality.

Statement 9. The method of statements 1-8, wherein the at least one other sensing modality includes a mass spectrometer, an x-ray diffraction analyzer, an x-ray fluorescence analyzer, a magnetic resonance imaging (MRI) scanner, a computed tomography (CT) scanner, and an optical imager.

Statement 10. The method of statements 1-9, wherein analyzing comprises comparing signal strengths at a plurality of frequencies for a particular material.

Statement 11. The method of statements 1-10, further comprising using machine learning to recognize patterns between the material and the resonance characteristics that indicate the presence of the material.

Statement 12. The method of statements 1-11, wherein transmitting the RF signal is performed by an RF transmitter, and wherein receiving the response signal from the environment comprises receiving the response signal using a multi-point receiving antenna, the method further comprising: calculating a direction of the material relative to the RF transmitter based on triangulating the response signal received by the multi-point receiving antenna; and displaying an indication of the direction of the material.

Statement 13. The method of statements 1-12, wherein transmitting the RF signal is performed by an RF transmitter, the method further comprising: calculating a distance between the RF transmitter and the material using time-of-flight data of the RF signal and the response signal.

Statement 14. The method of statements 1-13, wherein calculating the distance between the RF transmitter and the material using the time-of-flight data comprises adjusting the time-of-flight data based on media through which the RF signal and the response signal must travel.

Statement 15. The method of statements 1-14, further comprising: calculating a mass of the material based on an amplitude of the response signal and the distance between the RF transmitter and the material.

Statement 16. The method of statements 1-15, wherein calculating the mass of the material comprises accessing a mass database associating distance, mass, and response signal amplitude for at least one of the plurality of materials in the material database.

Statement 17. A system for material detection and identification, the system comprising: an interface configured to access a material database associating each of a plurality of materials with one or more corresponding resonance frequencies; an RF transmitter configured to, for each material of at least a subset of the plurality of materials in the material database, transmit into an environment an RF signal at a first resonance frequency for the material; an RF receiver configured to receive a response signal from the environment for each RF signal; and a processor configured to analyze each response signal for resonance characteristics that indicate a presence of the material and identifying the material to a user if the presence of the material is indicated by the resonance characteristics.

Statement 18. The system of statement 17, wherein the material database indicates a priority of detecting each material of the at least the subset of materials for one or more applications, and wherein the RF transmitter is configured to transmit into the environment the RF signal at the first resonance frequency for each material in order of the priority for a specific application.

Statement 19. The system of statements 17-18, wherein the processor is further configured to generate a user interface for the user to select the at least the subset of the plurality of materials.

Statement 20. The system of statements 17-19, wherein, if no materials are identified or ambiguous resonance characteristics are detected, the RF transmitter is further configured to, for at least one material of the at least the subset of the plurality of materials in the material database, transmit into the environment at least one RF signal at a second resonance frequency for the at least one material.

Statement 21. The system of statements 17-20, wherein, if no materials are identified or ambiguous resonance characteristics are detected, the processor is further configured to incorporate at least one of environmental or contextual data to refine a likelihood of specific materials being present.

Statement 22. The system of statements 17-21, wherein, if no materials are identified or ambiguous resonance characteristics are detected, the processor is further configured to analyze at least one of a timing of receipt or amplitude of the response signal.

Statement 23. The system of statements 17-22, wherein, if no materials are identified or ambiguous resonance characteristics are detected, the processor is further configured to repeat a detection process using one or more different materials databases.

Statement 24. The system of statements 17-23, wherein, if no materials are identified or ambiguous resonance characteristics are detected, the processor is further configured to integrate input from at least one other sensing modality.

Statement 25. The system of statements 17-24, wherein the at least one other sensing modality includes a mass spectrometer, an x-ray diffraction analyzer, an x-ray fluorescence analyzer, a magnetic resonance imaging (MRI) scanner, a computed tomography (CT) scanner, and an optical imager.

Statement 26. The system of statements 17-25, further comprising a machine learning system to recognize patterns between the material and the resonance characteristics that indicate the presence of the material.

Statement 27. The system of statements 17-26, wherein the RF receiver includes a multi-point receiving antenna, and wherein the processor is further configured to calculate a direction of the material relative to the RF transmitter based on triangulating the response signal received by the multi-point receiving antenna and displaying an indication of the direction of the material.

Statement 28. The system of statements 17-27, wherein the processor is further configured to calculate a distance between the RF transmitter and the material using time-of-flight data of the RF signal and the response signal and displaying the distance between the RF transmitter and the material.

Statement 29. The system of statements 17-28, wherein the processor is configured to calculate the distance between the RF transmitter and the material using the time-of-flight data by adjusting the time-of-flight data based on media through which the RF signal and the response signal must travel.

Statement 30. The system of statements 17-29, wherein the processor is further configured to calculate a mass of the material based on an amplitude of the response signal and the distance between the RF transmitter and the material and to display the mass of the material.

Statement 31. The system of statements 17-30, wherein the processor is configured to calculate the mass of the material by accessing a mass database associating distance, mass, and response signal amplitude for at least one of the plurality of materials in the material database.

One skilled in the art will readily appreciate that the present disclosure is adapted to carry out the objects and obtain the ends and advantages mentioned, as well as those inherent therein. Changes and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A method for material detection and identification, the method comprising:
    accessing a material database associating each of a plurality of materials with one or more corresponding resonance frequencies; and
    for each material of at least a subset of the plurality of materials in the material database:
        transmitting into an environment a radio frequency (RF) signal at a first resonance frequency for the material;
        receiving a response signal from the environment;
        analyzing the response signal for resonance characteristics that indicate a presence of the material; and
        identifying the material to a user if the presence of the material is indicated by the resonance characteristics,
        wherein the material database indicates a priority of detecting each material of the at least the subset of materials for one or more applications, and wherein transmitting includes transmitting into the environment the RF signal at the first resonance frequency for each material in order of the priority for a specific application.

2. The method of claim 1, wherein the at least the subset of the plurality of materials is selected by the user.

3. The method of claim 1, further comprising, if no materials are identified or ambiguous resonance characteristics are detected, repeating the steps of transmitting, receiving, analyzing, and identifying using a second resonance frequency for one or more of the materials in the material database.

4. The method of claim 1, further comprising, if no materials are identified or ambiguous resonance characteristics are detected, incorporating at least one of environmental or contextual data to refine a likelihood of specific materials being present.

5. The method of claim 1, further comprising, if no materials are identified or ambiguous resonance characteristics are detected, analyzing at least one of a timing of receipt or amplitude of the response signal.

6. The method of claim 1, further comprising, if no materials are identified or ambiguous resonance characteristics are detected, repeating the steps of transmitting, receiving, analyzing, and identifying using one or more different materials databases.

7. The method of claim 1, further comprising, if no materials are identified or ambiguous resonance characteristics are detected, integrating input from at least one other sensing modality.

8. The method of claim 7, wherein the at least one other sensing modality includes a mass spectrometer, an x-ray diffraction analyzer, an x-ray fluorescence analyzer, a magnetic resonance imaging (MRI) scanner, a computed tomography (CT) scanner, and an optical imager.

9. The method of claim 1, wherein the analyzing comprises comparing signal strengths at a plurality of frequencies for a particular material.

10. The method of claim 1, further comprising using machine learning to recognize patterns between the material and the resonance characteristics that indicate the presence of the material.

11. The method of claim 1, wherein transmitting the RF signal is performed by an RF transmitter, and wherein receiving the response signal from the environment comprises receiving the response signal using a multi-point receiving antenna, the method further comprising:
calculating a direction of the material relative to the RF transmitter based on triangulating the response signal received by the multi-point receiving antenna; and
displaying an indication of the direction of the material.

12. The method of claim 1, wherein transmitting the RF signal is performed by an RF transmitter, the method further comprising:
calculating a distance between the RF transmitter and the material using time-of-flight data of the RF signal and the response signal.

13. The method of claim 12, wherein calculating the distance between the RF transmitter and the material using the time-of-flight data comprises adjusting the time-of-flight data based on media through which the RF signal and the response signal must travel.

14. The method of claim 12, further comprising:
calculating a mass of the material based on an amplitude of the response signal and the distance between the RF transmitter and the material.

15. The method of claim 14, wherein the calculating the mass of the material comprises accessing a mass database associating distance, mass, and response signal amplitude for at least one of the plurality of materials in the material database.

16. A system for material detection and identification, the system comprising:
an interface configured to access a material database associating each of a plurality of materials with one or more corresponding resonance frequencies;
a radio frequency (RF) transmitter configured to, for each material of at least a subset of the plurality of materials in the material database, transmit into an environment an RF signal at a first resonance frequency for the material;
an RF receiver configured to receive a response signal from the environment for each RF signal; and
a processor configured to analyze each response signal for resonance characteristics that indicate a presence of the material and identify the material to a user if the presence of the material is indicated by the resonance characteristics,
wherein the material database indicates a priority of detecting each material of the at least the subset of materials for one or more applications, and wherein the RF transmitter is configured to transmit into the environment the RF signal at the first resonance frequency for each material in order of the priority for a specific application.

17. The system of claim 16, wherein the processor is further configured to generate a user interface for the user to select the at least the subset of the plurality of materials.

18. The system of claim 16, wherein, if no materials are identified or ambiguous resonance characteristics are detected, the RF transmitter is further configured to, for at least one material of the at least the subset of the plurality of materials in the material database, transmit into the environment at least one RF signal at a second resonance frequency for the at least one material.

19. The system of claim 16, wherein, if no materials are identified or ambiguous resonance characteristics are detected, the processor is further configured to incorporate at least one of environmental or contextual data to refine a likelihood of specific materials being present.

20. The system of claim 16, wherein, if no materials are identified or ambiguous resonance characteristics are detected, the processor is further configured to analyze at least one of a timing of receipt or amplitude of the response signal.

21. The system of claim 16, wherein, if no materials are identified or ambiguous resonance characteristics are detected, the processor is further configured to repeat a detection process using one or more different materials databases.

22. The system of claim 16, wherein, if no materials are identified or ambiguous resonance characteristics are detected, the processor is further configured to integrate input from at least one other sensing modality.

23. The system of claim 22, wherein the at least one other sensing modality includes a mass spectrometer, an x-ray diffraction analyzer, an x-ray fluorescence analyzer, a magnetic resonance imaging (MRI) scanner, a computed tomography (CT) scanner, and an optical imager.

24. The system of claim 16, further comprising a machine learning system to recognize patterns between the material and the resonance characteristics that indicate the presence of the material.

25. The system of claim 16, wherein the RF receiver includes a multi-point receiving antenna, and wherein the processor is further configured to calculate a direction of the material relative to the RF transmitter based on triangulating the response signal received by the multi-point receiving antenna and displaying an indication of the direction of the material.

26. The system of claim 16, wherein the processor is further configured to calculate a distance between the RF transmitter and the material using time-of-flight data of the RF signal and the response signal and display the distance between the RF transmitter and the material.

27. The system of claim 26, wherein the processor is configured to calculate the distance between the RF transmitter and the material using the time-of-flight data by adjusting the time-of-flight data based on media through which the RF signal and the response signal must travel.

28. The system of claim 26, wherein the processor is further configured to calculate a mass of the material based on an amplitude of the response signal and the distance between the RF transmitter and the material and to display the mass of the material.

29. The system of claim 28, wherein the processor is configured to calculate the mass of the material by accessing a mass database associating distance, mass, and response signal amplitude for at least one of the plurality of materials in the material database.

\* \* \* \* \*